US012294880B2

(12) United States Patent
Morioka

(10) Patent No.: US 12,294,880 B2
(45) Date of Patent: *May 6, 2025

(54) WIRELESS COMMUNICATION DEVICE

(71) Applicant: SONY GROUP CORPORATION, Tokyo (JP)

(72) Inventor: Yuichi Morioka, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 216 days.

This patent is subject to a terminal disclaimer.

(21) Appl. No.: 17/949,444

(22) Filed: Sep. 21, 2022

(65) Prior Publication Data

US 2023/0015192 A1 Jan. 19, 2023

Related U.S. Application Data

(63) Continuation of application No. 16/956,687, filed as application No. PCT/JP2018/046019 on Dec. 14, 2018, now Pat. No. 11,477,672.

(30) Foreign Application Priority Data

Dec. 28, 2017 (JP) ................................ 2017-253151

(51) Int. Cl.
*H04W 24/08* (2009.01)
*H04W 24/10* (2009.01)
(Continued)

(52) U.S. Cl.
CPC .......... *H04W 24/08* (2013.01); *H04W 36/30* (2013.01); *H04W 24/10* (2013.01); *H04W 84/12* (2013.01)

(58) Field of Classification Search
CPC ...... H04W 24/08; H04W 24/10; H04W 84/12
See application file for complete search history.

(56) References Cited

U.S. PATENT DOCUMENTS 11,477,672 B2* 10/2022 Morioka ............... H04W 36/38
2008/0233916 A1* 9/2008 Wang .................... H04W 76/50
455/404.2

(Continued)

FOREIGN PATENT DOCUMENTS

CN 104272784 A 1/2015
CN 105230049 A 1/2016
(Continued)

OTHER PUBLICATIONS

Partial Search Report of EP Application No. 18896255.9, issued on Dec. 17, 2020, 16 pages.
(Continued)

*Primary Examiner* — Mohammad S Anwar
(74) *Attorney, Agent, or Firm* — CHIP LAW GROUP

(57) ABSTRACT

Provided is a wireless communication device that is connected to one or a plurality of target wireless communication devices, and that includes a transmission unit that transmits, to another wireless communication device, a measurement request signal requesting measurement related to a propagation status of a signal from the target wireless communication device, and a receiving unit that receives a measurement request response signal transmitted from the another wireless communication device in response to the measurement request signal, the measurement request response signal including a result of the measurement. The present technology can be applied to a wireless base station and a wireless terminal station.

20 Claims, 13 Drawing Sheets

(51) Int. Cl.
*H04W 36/30* (2009.01)
*H04W 84/12* (2009.01)

(56) References Cited

U.S. PATENT DOCUMENTS

| | | | |
|---|---|---|---|
| 2015/0023271 | A1 | 1/2015 | Nakano |
| 2015/0131570 | A1* | 5/2015 | Kwon ................ H04W 74/002 370/329 |
| 2016/0007278 | A1 | 1/2016 | Gupta et al. |
| 2016/0112921 | A1 | 4/2016 | Nagasaka et al. |
| 2016/0165574 | A1 | 6/2016 | Chu et al. |
| 2016/0165589 | A1 | 6/2016 | Chu et al. |
| 2019/0313404 | A1 | 10/2019 | Chu et al. |
| 2019/0394722 | A1 | 12/2019 | Gupta et al. |
| 2020/0107318 | A1 | 4/2020 | Chu et al. |

FOREIGN PATENT DOCUMENTS

| | | |
|---|---|---|
| CN | 107431584 A | 12/2017 |
| EP | 2974389 A1 | 1/2016 |
| EP | 2996395 A1 | 3/2016 |
| EP | 3228041 A1 | 10/2017 |
| JP | 2012-182568 A | 9/2012 |
| JP | 2013-219653 A | 10/2013 |
| JP | 2016-526856 A | 9/2016 |
| KR | 10-2015-0129843 A | 11/2015 |
| TW | 201446061 A | 12/2014 |
| WO | 2013/168197 A1 | 11/2013 |
| WO | 2014/145073 A1 | 9/2014 |
| WO | 2014/181830 A1 | 11/2014 |
| WO | 2016/011337 A1 | 1/2016 |
| WO | 2016/090372 A1 | 6/2016 |

OTHER PUBLICATIONS

International Search Report and Written Opinion of PCT Application No. PCT/JP2018/046019, issued on Mar. 5, 2019, 08 pages of English Translation and 07 pages of ISRWO.
International Preliminary Report on Patentability of PCT Application No. PCT/JP2018/046019, issued on Jul. 9, 2020, 09 pages of English Translation and 04 pages of IPRP.
Non-Final Office Action for U.S. Appl. No. 16/956,687, issued on Mar. 10, 2022, 12 pages.
Notice of Allowance for U.S. Appl. No. 16/956,687, issued on Jun. 20, 2022, 05 pages.

* cited by examiner

FIG. 4

| B0 B3 | B4 B15 | B16 | B17 | B18 B19 | B20 B21 | B22 | B23 B25 | B26 |
|---|---|---|---|---|---|---|---|---|
| Trigger Type | Length | Cascade Indication | CS Required | BW | GI And LTF Type | MU-MIMO LTF Mode | Number Of HE-LTF Symbols | STBC |

Bits: 4, 12, 1, 1, 2, 2, 1, 3, 1

| B27 | B28 B33 | B34 B36 | B37 B52 | B53 | B54 B62 | B63 | |
|---|---|---|---|---|---|---|---|
| LDPC Extra Symbol Segment | AP TX Power | Packet Extension | Spatial Reuse | Doppler | HE-SIG-A Reserved | Reserved | Trigger Dependent Common Info |

Bits: 1, 6, 3, 16, 1, 9, 1, variable

FIG. 5

| AID 12 | RU Allocation | Coding Type | MCS | DCM | SS Allocation | Target RSSI | Reserved | Trigger Dependent User Info |
|---|---|---|---|---|---|---|---|---|
| B0 B11 | B12 B19 | B20 | B21 B24 | B25 | B26 B31 | B32 B38 | B39 | |
| 12 | 8 | 1 | 4 | 1 | 6 | 7 | 1 | variable |

Bits:

WIRELESS COMMUNICATION DEVICE

CROSS REFERENCE TO RELATED APPLICATIONS

This application is a continuation application of U.S. patent application Ser. No. 16/956,687, filed on Jun. 22, 2020, is a U.S. National Phase of International Patent Application No. PCT/JP2018/046019 filed on Dec. 14, 2018, which claims priority benefit of Japanese Patent Application No. JP 2017-253151 filed in the Japan Patent Office on Dec. 28, 2017. Each of the above-referenced applications is hereby incorporated herein by reference in its entirety.

TECHNICAL FIELD

The present technology relates to a wireless communication device, and in particular, relates to a wireless communication device that is adapted to be capable of effectively utilizing frequency resources.

BACKGROUND ART

Conventionally, various technologies are proposed as technologies related to wireless communications.

For example, as a technology related to wireless communications, there is proposed a technology in which a frame is given/received between wireless communication devices such as a wireless base station (Access Point (AP)) and a wireless terminal station (Station (STA)) so as to support cooperative and sectorized transmission (refer to, for example, Patent Document 1).

CITATION LIST

Patent Document

Patent Document 1: Japanese Patent Application Laid-Open No. 2016-526856

SUMMARY OF THE INVENTION

Problems to be Solved by the Invention

Incidentally, in recent years, with the spread of wireless communication systems in conformity with the Institute of Electrical and Electronic Engineers (IEEE) 802.11 that are wireless communication standards, there is a case where a plurality of wireless base stations (access points (APs)) is installed at home.

According to the current standards, a wireless base station (AP) to be connected is determined by independent judgment of a wireless terminal station (station (STA)). Therefore, there occurs a phenomenon called Sticky Client in which even if, for example, movement of a wireless terminal station (STA) causes a wireless base station (AP) serving as the optimum connection destination to change, the wireless terminal station (STA) tries to keep connection to the wireless base station (AP) that is in a connection state.

As the result, efficiency in the use of frequency resources decreases, which disables efficient communication in each Basic Service Set (BSS).

The present technology has been devised in consideration of such a situation, and is adapted to be capable of effectively utilizing frequency resources.

Solutions to Problems

A wireless communication device according to a first aspect of the present technology is a wireless communication device that is connected to one or a plurality of target wireless communication devices, and that includes: a transmission unit that transmits, to another wireless communication device, a measurement request signal requesting measurement related to a propagation status of a signal from the target wireless communication device; and a receiving unit that receives a measurement request response signal transmitted from the another wireless communication device in response to the measurement request signal, the measurement request response signal including a result of the measurement.

According to the first aspect of the present technology, in a wireless communication device connected to one or a plurality of target wireless communication devices, a measurement request signal requesting measurement related to a propagation status of a signal from the target wireless communication device is transmitted to another wireless communication device, and a measurement request response signal transmitted from the another wireless communication device in response to the measurement request signal is received, the measurement request response signal including a result of the measurement.

A wireless communication device according to a second aspect of the present technology includes: a receiving unit that, with respect to one or a plurality of target wireless communication devices connected to another wireless communication device, receives a measurement request signal requesting measurement related to a propagation status of a signal from the target wireless communication device, the measurement request signal having been transmitted from the another wireless communication device; a signal generation unit that, in response to the measurement request signal, generates a measurement request response signal including a result of the measurement related to the propagation status of the signal from the target wireless communication device; and a transmission unit that transmits the measurement request response signal to the another wireless communication device.

According to the second aspect of the present technology, there is provided a wireless communication device in which: with respect to one or a plurality of target wireless communication devices connected to another wireless communication device, a measurement request signal requesting measurement related to a propagation status of a signal from the target wireless communication device is received, the measurement request signal having been transmitted from the another wireless communication device; in response to the measurement request signal, a measurement request response signal including a result of the measurement related to the propagation status of the signal from the target wireless communication device is generated; and the measurement request response signal is transmitted to the another wireless communication device.

A wireless communication device according to a third aspect of the present technology includes: a receiving unit that receives a connection request inducing signal that has been transmitted from a first wireless communication device connected, and that gives an instruction on transmission of a connection request signal requesting connection to a second wireless communication device determined as its own new connection destination; and a transmission unit that transmits the connection request signal to the second wireless communication device according to the connection request inducing signal.

According to the third aspect of the present technology, there is provided a wireless communication device in which: a connection request inducing signal that has been transmitted from a first wireless communication device connected, and that gives an instruction on transmission of a connection request signal requesting connection to a second wireless communication device determined as its own new connection destination is received; and the connection request signal is transmitted to the second wireless communication device according to the connection request inducing signal.

Effects of the Invention

According to the first to third aspects of the present technology, frequency resources can be effectively utilized.

It should be noted that the effects described herein are not necessarily limited, and may be any one of the effects described in the present disclosure.

BRIEF DESCRIPTION OF DRAWINGS

FIG. 4 is a diagram illustrating an example of a Common Info field.

FIG. 5 is a diagram illustrating an example of a User Info field.

MODE FOR CARRYING OUT THE INVENTION

Embodiments to which the present technology is applied will be described below with reference to the accompanying drawings.

First Embodiment

<About the Present Technology>

In the present technology, a wireless base station (AP) designates an appropriate wireless base station (AP), which serves as a connection destination of a wireless terminal station (STA), by using a trigger frame (Trigger Frame) defined by, for example, IEEE 802.11ax, and consequently frequency resources can be effectively utilized.

Hereinafter, in particular, the wireless base station (AP) is referred to as "access point", and the wireless terminal station (STA) is referred to as "station".

As described above, in a case where a station independently selects an access point that serves as a connection destination, there occurs a phenomenon called Sticky Client in which even when movement or the like of the station causes the optimum connection destination to change, a connection at the present point of time will be maintained.

Figure 1:
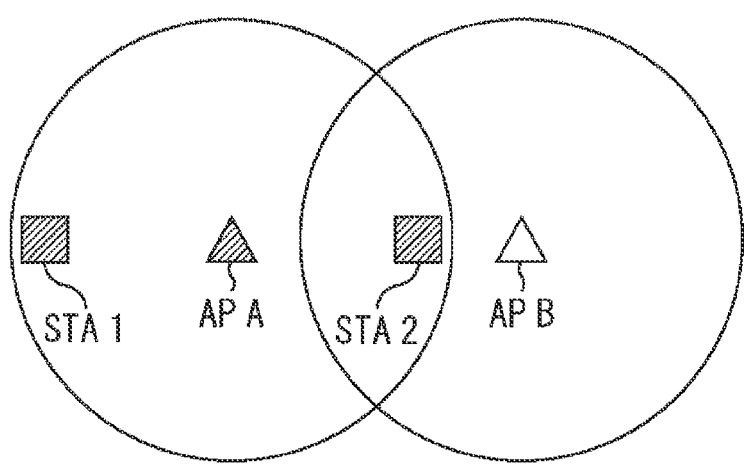
FIG. 1 is a diagram illustrating an example of topology of a wireless network.

Specifically, as shown in, for example, FIG. 1, it is assumed that there are two access points AP A and AP B, the wirelessly communicatable communication ranges of which partially overlap each other.

In addition, it is assumed that stations STA1 and STA2, which are located in proximity to the access point AP A, are in a state of being connected to the access point AP A. In other words, it is assumed that the stations STA1 and STA2 are in a state of being under the control of the access point AP A.

Here, the state in which a station is connected to an access point is a state in which the station transmits a connection request signal (Association Request) to the access point, the access point then transmits a connection request response signal (Association Response) indicating that a connection is permitted in response to the connection request signal, and consequently the station is associated.

In the state in which the station is associated (connected), the station and the access point recognize that those devices are mutually connected, and are in a state in which the station and the access point are capable of communicating with each other.

In addition, in FIG. 1, the stations STA1 and STA2 exist at respective positions equidistant from the access point AP A that is a connection destination. In other words, a distance from the station STA1 to the access point AP A is equivalent to a distance from the station STA2 to the access point AP A.

Moreover, in this example, although the station STA2 is under the control of the access point AP A, the station STA2 exists at a position that is closer in distance to the connectable access point AP B than the access point AP A.

Therefore, there is a case where using not the access point AP A but the access point AP B as a connection destination of the station STA2 enables more efficient communication.

Specifically, for example, it is assumed that the access point AP A and the access point AP B are both connected to a backhaul, and even if a station is connected to any of the access point AP A and the access point AP B, the station is capable of performing desired communication. In other words, the stations STA1 and STA2, which are under the control of the access point AP A, both exist at positions connectable to the access point AP B.

In addition, it is assumed that the access point AP A, the access point AP B, the station STA1, and the station STA2 exist within a communicatable range within which communications can be performed thereamong, and those devices perform communications using the same frequency resources.

Figure 2:
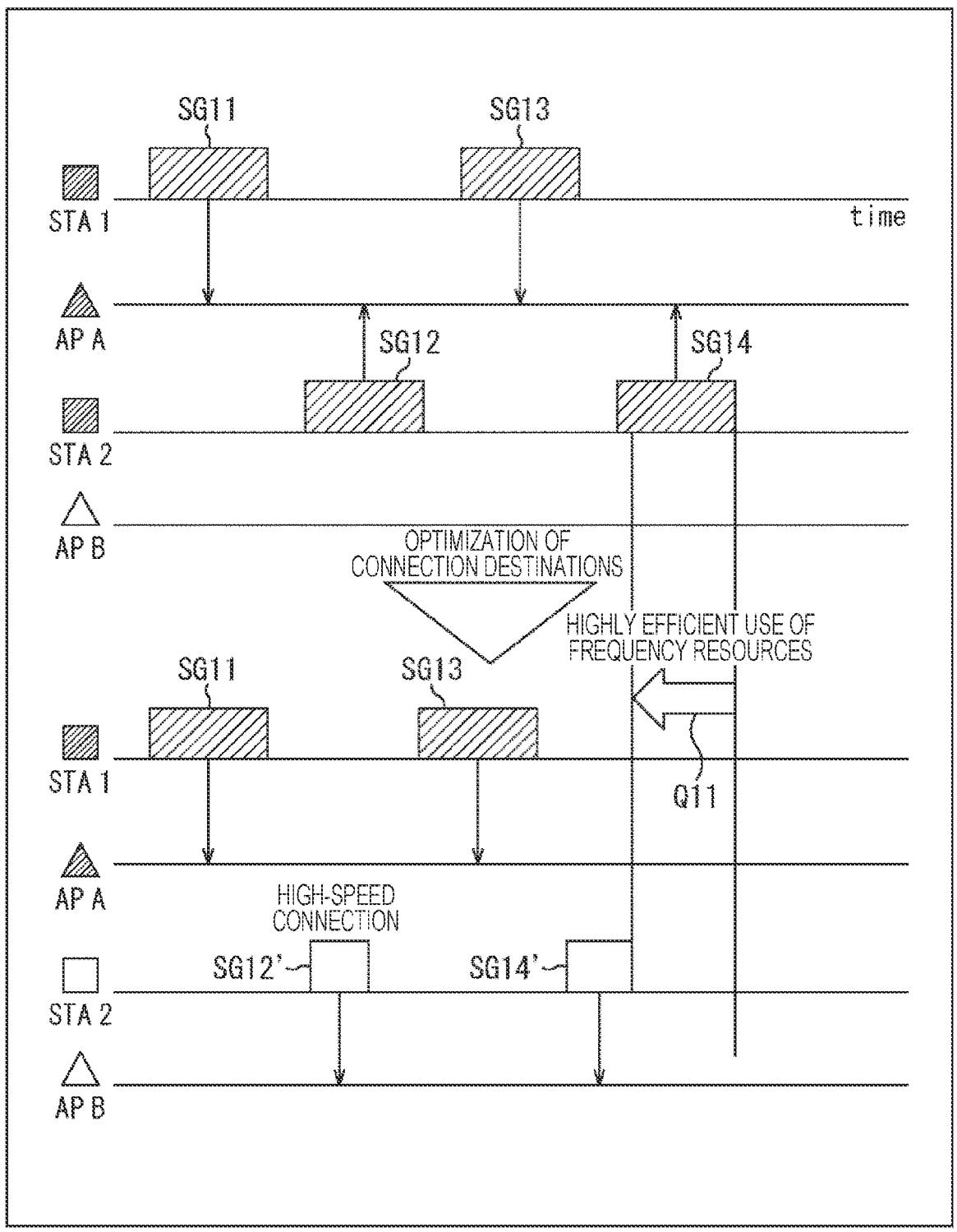
FIG. 2 is a diagram illustrating optimization of connection destinations, and a packet sequence.

In such a case, when positional relationship among the access point AP A, the access point AP B, the station STA1, and the station STA2 is in a state shown in FIG. 1, optimizing connection destinations as shown in, for example, FIG. 2 enables efficiency in the use of frequency resources to be enhanced.

It should be noted that in FIG. 2, identical reference numerals are used to denote parts corresponding to those shown in FIG. 1, and the description thereof will be omitted as appropriate. In addition, in FIG. 2, the horizontal axis indicates the time. Further, although FIG. 2 illustrates a case where the number of stations targeted for the optimization of connection destinations is two, the number of stations targeted for the optimization of connection destinations may be one or two or more. Moreover, the number of access points that are candidates of new connection destinations of stations may be two or more.

The upper side of FIG. 2 illustrates an example of a packet sequence used in a case where connection destinations are not optimized.

In this example, the station STA1 and the station STA2 are under the control of the access point AP A. First of all, the station STA1 transmits a signal SG11 that includes one or a plurality of packets to the access point AP A.

After the signal SG11 is transmitted, the station STA2 transmits a signal SG12 that includes one or a plurality of packets to the access point AP A. However, since the station STA1 cannot transmit a signal during that time, the station STA1 is in a standby state.

In addition, after the transmission of the signal SG12 ends, the station STA1 transmits a signal SG13 to the access point AP A, and after the transmission of the signal SG13, the station STA2 transmits a signal SG14 to the access point AP A.]

Here, the station STA1 and the station STA2 are located at respective positions equidistant from the access point AP A that is the connection destination, and therefore the signals SG11 to SG14 are transmitted at the same transmission rate.

In this manner, the station STA1 and the station STA2 perform communications by being connected to the access point AP A. However, as shown in FIG. 1, the station STA2 exists at a position that is closer to the access point AP B than the access point AP A.

Accordingly, performing optimization of connection destinations, in other words, handover of a connection destination, and changing the connection destination of the station STA2 from the access point AP A to the access point AP B that is closer to the station STA2, enables efficiency in the use of frequency resources to be enhanced.

The lower side of FIG. 2 illustrates an example of a packet sequence used in a case where the optimization of connection destinations causes the station STA2 to be reconnected to the access point AP B, in other words, in a case where handover to the access point AP B is performed for the station STA2.

In this example, the station STA1 is in a state of being connected to the access point AP A, and the station STA2 is in a state of being connected to the access point AP B.

In this case, first of all, the station STA1 transmits the signal SG11 to the access point AP A. During that time, the station STA2 waits without transmitting a signal in order to prevent the signal from being interfered with a signal transmitted by the station STA2 itself.

Subsequently, after the transmission of the signal SG11 ends, the station STA2 then transmits a signal SG12' to the access point AP B, and while the signal SG12' is transmitted, the station STA1 waits without transmitting a signal.

After the transmission of the signal SG12' ends, the station STA1 transmits the signal SG13 to the access point AP A, and after the transmission of the signal SG13, the station STA2 transmits a signal SG14' to the access point AP B.

Here, a distance from the station STA2 to the access point AP B is shorter than a distance from the station STA2 to the access point AP A, and therefore the signal SG12' and the signal SG14' are transmitted at a transmission rate higher than that of the signal SG12 and the signal SG14.

In a case where a distance between a station and an access point that perform communications is short, a propagation loss of a signal decreases. Therefore, since a signal can be received at stronger received power on the receiving side, there is a higher possibility that the signal can be correctly received. In addition, there is thus a lower possibility that the signal will be retransmitted. In other words, a success rate of communication increases. For this reason, by increasing the transmission rate of the signal with the decrease in distance between the station and the access point, higher speed communications can be performed.

On the upper and lower sides of FIG. 2, the same transmission request is made, and results in the same packet sequence. However, since the signal SG12' and the signal SG14' are transmitted at a transmission rate higher than that of the signal SG12 and the signal SG14, the time taken to transmit those signals is shortened.

As the result, in the example in which the optimization of connection destinations has been performed shown in the lower side of FIG. 2, the communication time is shortened by the time shown in an arrow Q11 in comparison with the example in which the optimization of connection destinations has not been performed, and accordingly the next signal transmission can be performed by using the shortened time period.

For this reason, it is revealed that by performing the optimization of connection destinations, communication can be completed in a shorter time period, and frequency resources can be more effectively utilized.

Next, the optimization of connection destinations as shown in, for example, FIG. 2, in other words, handover of a station to a new connection destination, will be described.

Figure 3:
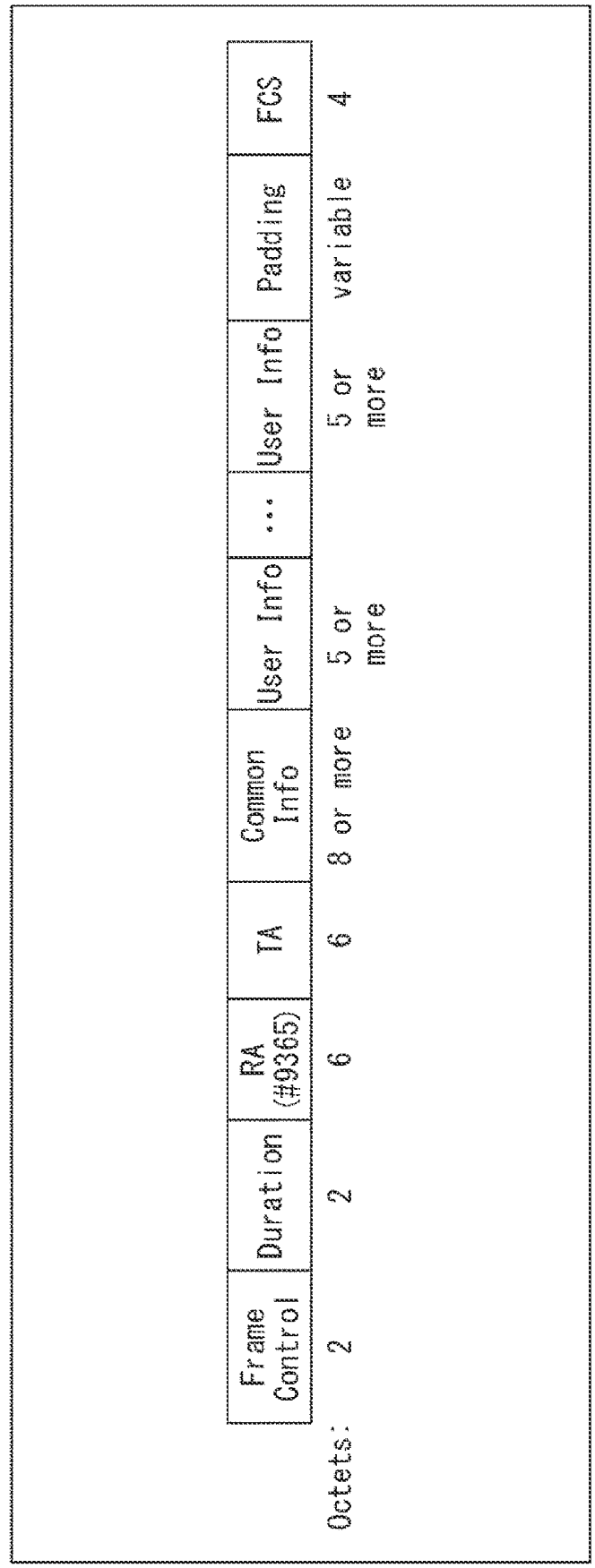
FIG. 3 is a diagram illustrating a configuration example of a trigger frame.

IEEE 802.11ax that corresponds to next-generation wireless LAN standards newly defines a control signal that is called trigger frame (Trigger Frame) having a configuration shown in, for example, FIG. 3.

The trigger frame shown in FIG. 3 can be transmitted to a plurality of wireless communication devices as destinations, and a Common Info field indicated by characters "Common Info" stores common information shared among one or a plurality of destinations of this trigger frame.

In addition, the trigger frame is provided with one or a plurality of User Info fields indicated by characters "User Info", and the User Info field stores individual information provided for each destination of this trigger frame.

Besides the above, the trigger frame has a field indicated by characters "FCS", and a frame check sequence is stored in the field.

The Common Info field of the trigger frame shown in, for example, FIG. 3 has a configuration shown in FIG. 4.

The Common Info field shown in FIG. 4 is provided with a trigger type field (Trigger Type Field) indicated by characters "Trigger Type".

This trigger type field stores type information indicating a type of a signal that should be transmitted by a wireless communication device designated by a trigger frame in response to receiving of the trigger frame, in other words, a type of a data frame that should be transmitted.

In addition, the Common Info field is provided with a field indicated by characters "Length", and this field stores information indicating a length of a trigger frame (signal length), in more detail, a length of a packet that stores the trigger frame.

Moreover, the Common Info field is provided with a field indicated by characters "AP TX Power", and this field stores trigger frame transmission power information indicating transmission power that is electric power at the time of transmission of a trigger frame.

In addition, the User Info field of the trigger frame shown in FIG. 3 has a configuration shown in FIG. 5.

The User Info field shown in FIG. 5 is provided with: a field indicated by characters "AID12"; a field indicated by characters "RU Allocation"; a field indicated by characters "Target RSSI"; and the like.

For example, the field indicated by characters "AID12" stores information indicating a wireless communication device that should transmit a signal, the type of which is indicated by type information, in response to receiving of a trigger frame, in other words, sender information indicating a wireless communication device that is a sender of the signal, the type of which is indicated by the type information. In a case where a trigger frame is provided with a plurality of User Info fields, each of those User Info fields stores different sender information.

In addition, the field indicated by characters "RU Allocation" stores resource information indicating a frequency resource and a space resource that should be used when the signal, the type of which is indicated by the type information, is transmitted in response to receiving of a trigger frame.

It should be noted that in a case where it is not particularly necessary to distinguish the frequency resource from the space resource, hereinafter the frequency resource and the space resource are also merely referred to as resources.

The field indicated by characters "Target RSSI" stores received power information indicating received power of a signal that should be ensured as a minimum on the receiving side of the signal when a signal, the type of which is indicated by type information, has been transmitted in response to receiving of a trigger frame. Here, the receiving side of the signal, the type of which is indicated by the type information, is basically an access point that is a sender of the trigger frame.

The trigger frame that is provided with the Common Info field and the User Info field such as those described above is, for example, transmitted from the access point to the station.

Therefore, when a station indicated by sender information in the field indicated by characters "AID12" receives a trigger frame, after the lapse of a fixed period of time from the reception time at which the trigger frame has been received, the station transmits a signal indicated by type information as a response signal responding to the trigger frame.

At this point, the response signal is transmitted by using the frequency resource and the space resource designated by resource information stored in the trigger frame. In other words, the response signal is transmitted by use of a frequency channel (frequency band) indicated by resource information, and by an antenna defined by the resource information. A difference in space resource of a response signal means that a transmission path (path) after the response signal has been transmitted until the response signal is received differs. Training fields of response signals transmitted in space resources that differ from each other store signals (training) of patterns that differ from each other.

Transmission of various kinds of signals is mainly controlled by a station in the past. However, introducing such a trigger frame enables an access point to manage transmission of a signal by a station.

In the present technology, an access point is adapted to designate an appropriate connection destination of a station by using a trigger frame defined by IEEE 802.11ax.

An example of a series of sequences performed when an access point designates a connection destination of a station will be described below with reference to FIGS. 6 to 8.

Incidentally, here, it is assumed that in the arrangement shown in FIG. 1, the access point AP A, the access point AP B, the station STA1, and the station STA2 exist, and the station STA1 and the station STA2 are under the control of the access point AP A.

Figure 6:
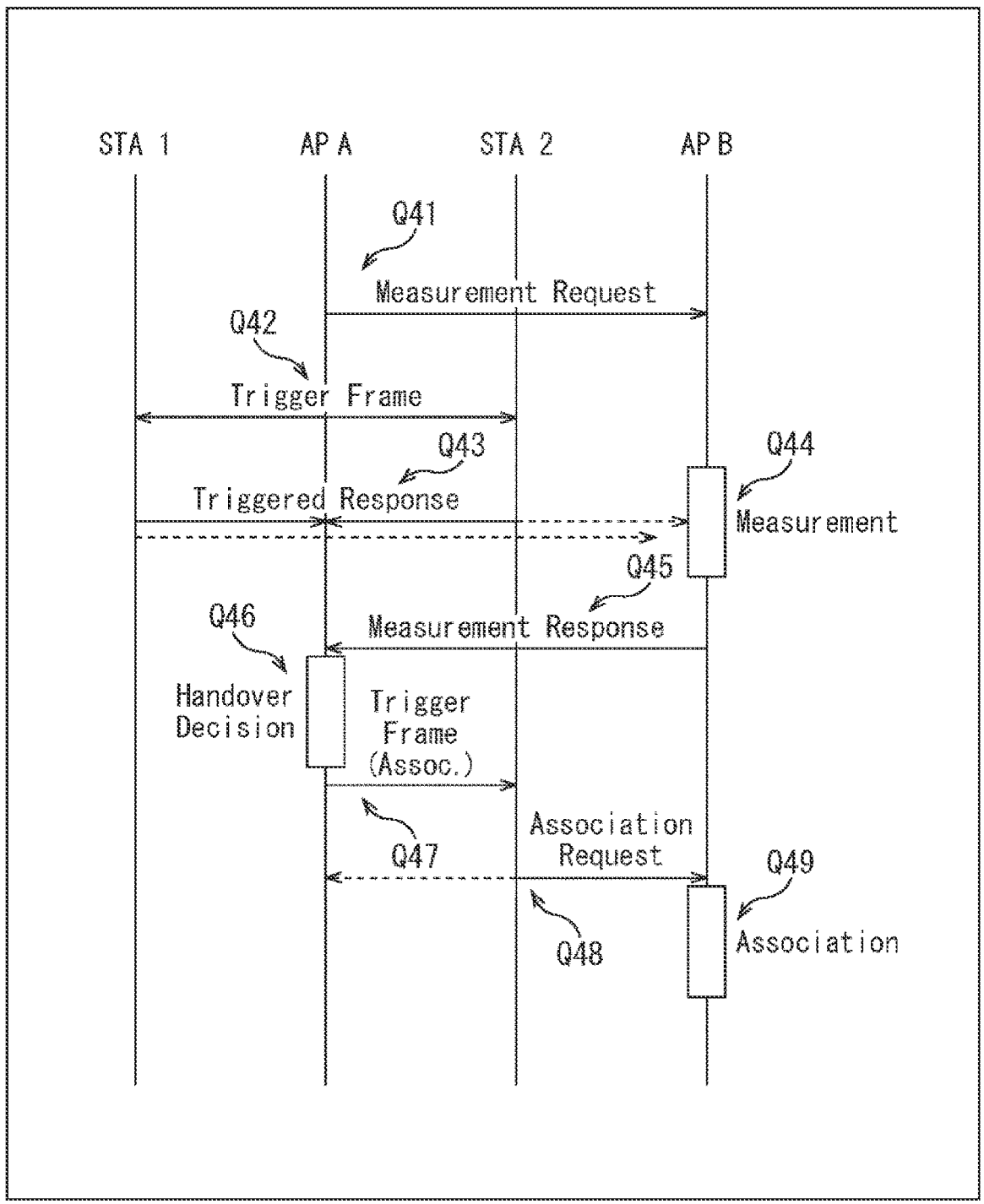
FIG. 6 is a diagram illustrating optimization of connection destinations.

First of all, as shown with an arrow Q41 of FIG. 6, the access point AP A transmits a measurement request frame (Measurement Request) to the access point AP B.

In addition, when the predetermined time elapses after the transmission of the measurement request frame, as shown with an arrow Q42, the access point AP A transmits a trigger frame (Trigger Frame) to the station STA1 and the station STA2 that are under the control of the access point AP A itself.

Here, the measurement request frame is a measurement request signal that requests measurement of distance indicator information that becomes an indicator of a distance from the access point AP B to each station under the control of the access point AP A. In other words, the measurement request frame is a measurement request signal that requests measurement related to a propagation status of a signal between the access point AP B and a station.

The distance indicator information is, for example, reception intensity of a trigger response frame (Triggered Response) that is a response signal responding to the trigger frame, in other words, received power or the like, at the access point AP B.

It should be noted that the access point AP A may notify the access point AP B of frequency resources and space resources at the time of the transmission of the trigger response frame, which are assigned to the station STA1 and the station STA2 respectively.

In addition, the trigger frame transmitted by the access point AP A is a transmission request signal that gives an instruction on transmission of a trigger response frame for measurement of distance indicator information. A trigger frame having a configuration shown in, for example, FIG. 3 is transmitted from the access point AP A.

In this case, in the example shown in FIG. 6, the type information is information indicating a trigger response frame, and a trigger frame is provided with two User Info fields. Further, sender information in one User Info field is information indicating the station STA1, and sender information in the other User Info field is information indicating the station STA2.

Moreover, the two User Info fields are adapted to store respective pieces of resource information different from each other. In other words, when a trigger response frame is transmitted by the station STA1, for at least either of a frequency resource and a space resource, a resource different from that used when a trigger response frame is transmitted by the station STA2 is used.

For example, in a case where space resources used to transmit two trigger response frames differ from each other, signal patterns of training fields in those trigger response frames differ. Therefore, the access point AP B is capable of distinguishing those received trigger response frames from each other.

By the transmission of the trigger frames such as those described above, the station is notified (informed) of the transmission timing of the trigger response frame that is a response signal responding to the trigger frame, and consequently transmission of a trigger frame/response frame is induced.

Figure 7:
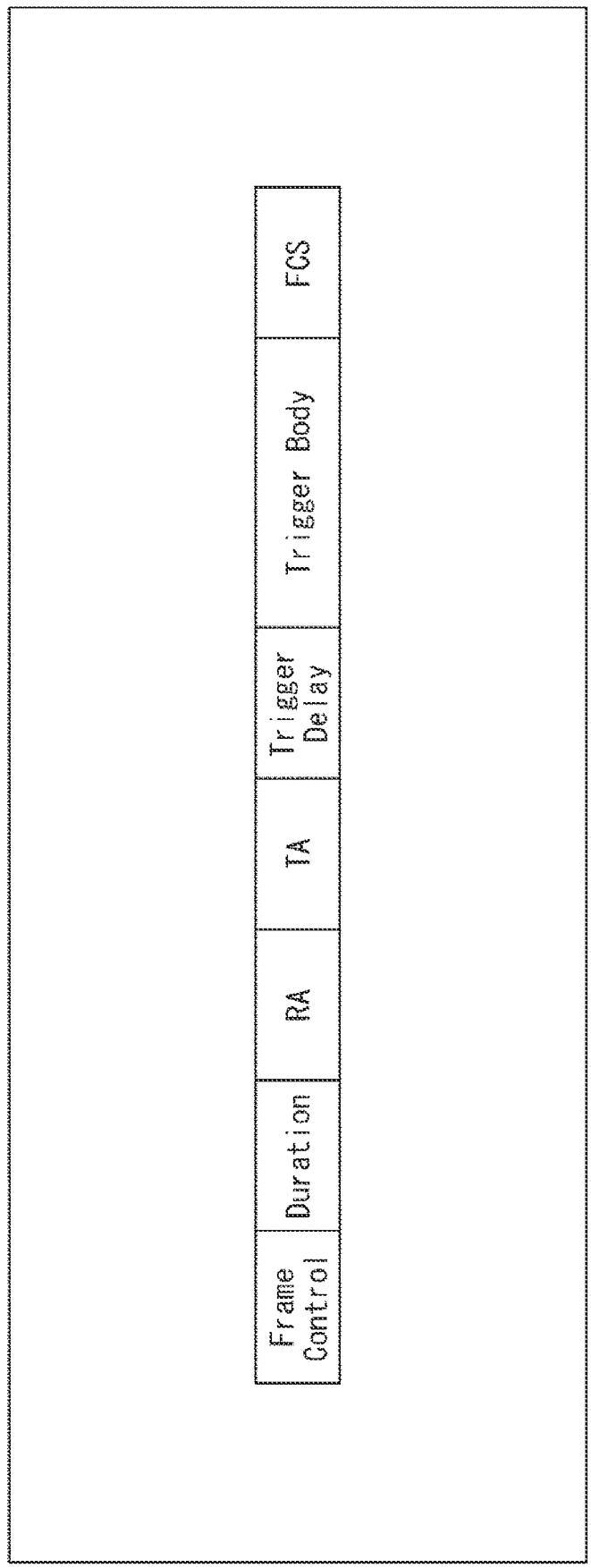
FIG. 7 is a diagram illustrating an example of a measurement request frame.

Here, FIG. 7 illustrates an example of a measurement request frame.

In the example shown in FIG. 7, the measurement request frame includes: trigger delay amount information indicated by characters "Trigger Delay"; a trigger body indicated by characters "Trigger Body"; and a frame check sequence indicated by characters "FCS".

For example, the trigger delay amount information is information that indicates the elapsed time (delay time) after a measurement request frame is transmitted until a trigger frame is transmitted.

Here, when a trigger frame has been received, a trigger response frame is transmitted after the lapse of the predetermined time. Therefore, it can be said that the trigger delay amount information is information used to identify the transmission timing of the trigger response frame.

In addition, the trigger body is information that includes information used to identify a station that transmits a trigger response frame, the information including, for example, information indicating a frequency resource and a space resource which are used at least at the time of transmission of a trigger response frame by a station.

Here, it is assumed that a trigger frame itself is treated as a trigger body. In other words, for each of the station STA1 and the station STA2, the trigger body includes sender information indicating a station, and resource information indicating a resource used by the station. Therefore, for example, sender information and resource information, which are included in the trigger body, are used as information used to identify a station that transmits a trigger response frame.

Returning to the explanation of FIG. 6, when a trigger frame is transmitted in the timing shown with the arrow Q42, the station STA1 and the station STA2 receive the trigger frame.

Subsequently, the station STA1 and the station STA2 refer to sender information included in the received trigger frame, and when it is identified that the station STA1/station STA2 itself is a sender of a signal, the type of which is indicated by type information, in other words, here, a sender of the trigger response frame, the station STA1 and the station STA2 each transmit a trigger response frame as shown with an arrow Q43.

These trigger response frames are response signals, each of which is transmitted as a response to the trigger frame that is a transmission request signal.

The station STA1 and the station STA2 each transmit a trigger response frame on the basis of the User Info field that includes sender information indicating the station STA1/the station STA2 itself, and information stored (included) in the Common Info field.

For example, the station STA1 and the station STA2 each transmit the trigger response frame by using transmission power determined by trigger frame transmission power information and received power information which are included in the trigger frame.

In addition, the trigger response frame is transmitted in the timing after the lapse of the predetermined time from the reception time of the trigger frame.

The trigger response frame that has been transmitted in this manner is received not only by the access point AP A but also by the access point AP B.

When the access point AP B receives the trigger response frame transmitted from the station STA1 or the station STA2, as shown with an arrow Q44, the access point AP B performs measurement processing (Measurement) for obtaining distance indicator information according to the measurement request frame received from the access point AP A.

In other words, the access point AP B performs measurement processing related to a propagation status of a signal between the access point AP B itself, and the station STA1 and the station STA2 on the basis of the receiving timing of the trigger response frame or the received trigger response frame.

For example, in the measurement processing, reception intensity (received power) of the received trigger response frame is measured, and the reception intensity obtained as a result thereof is used as distance indicator information as it is.

The shorter a distance from a station, which is a sender of a trigger response frame, to the access point AP B, the higher (stronger) the reception intensity of the trigger response frame becomes. Therefore, it can be said that the reception intensity obtained in this manner is information used as an indicator indicating a distance between the station and the access point AP B.

For example, it is assumed that in a case where positional relationship among the access points and the stations is equivalent to that shown in FIG. 1, transmission power for transmitting the trigger response frame from the station STA1 is the same as transmission power for transmitting the trigger response frame from the station STA2.

As described above, transmission power for transmitting the trigger response frame is determined by the trigger frame transmission power information and the received power information in the trigger frame. In other words, the transmission power for transmitting the trigger response frame, in more detail, received power on the receiving side of the trigger response frame, is designated by the trigger frame.

In this case, at the access point AP B, the reception intensity of the trigger response frame received from the station STA2, which is located at a position nearer from the access point AP B itself, must be higher than the reception intensity of the trigger response frame received from the station STA1 located at a position farther from the access point AP B itself.

It should be noted that on the basis of the trigger delay amount information included in the measurement request frame received from the access point AP A, the access point AP B is capable of grasping the approximate timing in which the trigger response frame is transmitted to the access point AP B itself.

The reason for the above is that since the time from the receipt of the trigger frame to the transmission of the trigger response frame is predetermined known information, on the assumption that the sum of that time and the time indicated by the trigger delay amount information is the scheduled time, the time after the lapse of the scheduled time from the reception time of the measurement request frame becomes the approximate arrival time of the trigger response frame.

In addition, here, the example in which the reception intensity is used as the distance indicator information has been described. However, any kind of information may be used as the distance indicator information so long as the information serves as an indicator of the distance between the access point AP B and the station that is the sender of the trigger response frame.

Specifically, for example, the reception time of the trigger response frame at the access point AP B, the time (delay amount) from the reception time (transmission time) of the measurement request frame to the reception time of the trigger response frame, the time (delay amount) from the transmission time of the trigger response frame to the reception time, an error property at the time of receiving the trigger response frame, a combination of those pieces of information, or the like, at the access point AP B, may be used as the distance indicator information.

For example, the shorter a distance from a station, which is a sender of a trigger response frame, to the access point AP B, the earlier the reception time of the trigger response frame becomes, and therefore this reception time can also be used as an indicator of the distance.

In this case, for example, with respect to the same trigger response frame, if a difference between the reception time of the trigger response frame at the access point AP B and the reception time of the trigger response frame at the access point AP A is determined, the reception time being indicated by the distance indicator information, the positional relationship among the devices can be grasped. In other words, by using the determined difference, it is possible to identify to which of the access point AP A and the access point AP B the station that is the sender of the trigger response frame is located at a position nearer.

This similarly applies to a case where the time (delay amount) from the reception time of the measurement request frame to the reception time of the trigger response frame, or the time (delay amount) from the transmission time of the trigger response frame to the reception time, is used as the distance indicator information. It should be noted that at the access point AP B, the approximate transmission time of the trigger response frame can be identified on the basis of the trigger delay amount information.

In addition, for example, in general, the longer a distance from a station, which is a sender of a trigger response frame, to the access point AP B, the number of receiving errors occurring at the time of receiving the trigger response frame increases, and therefore a receiving error rate (rate of occurrence of receiving errors) increases. Therefore, an error property at the time of receiving the trigger response frame, in other words, the receiving error rate, can also be used as an indicator of the distance.

In this case, for example, by configuring the trigger response frame to include one or a plurality of frame check sequences, the receiving error rate at the time of receiving the trigger response frame can be obtained by computation that uses those frame check sequences. This is because the computation that uses the frame check sequences enables whether or not a signal of a part that includes the frame check sequences could have been correctly received, in other words, whether or not a receiving error has occurred, to be identified.

If the receiving error rate obtained in this manner is used as the distance indicator information, by comparing the receiving error rate as the distance indicator information with a receiving error rate at the access point AP A, the positional relationship among the devices can be grasped. In other words, it is possible to identify to which of the access point AP A and the access point AP B the station that is the sender of the trigger response frame is located at a position nearer.

When the distance indicator information is obtained by the measurement processing, as shown with an arrow Q45, the access point AP B transmits, to the access point AP A, the measurement response frame (Measurement Response) that includes the distance indicator information obtained as a result of the measurement processing.

This measurement response frame is a measurement request response signal serving as a response to the measurement request frame that is a measurement request signal.

For each station that has transmitted a trigger response frame, for example, the measurement response frame includes a result of measurement corresponding to the measurement request frame, in other words, distance indicator information obtained by the measurement processing.

Figure 8:
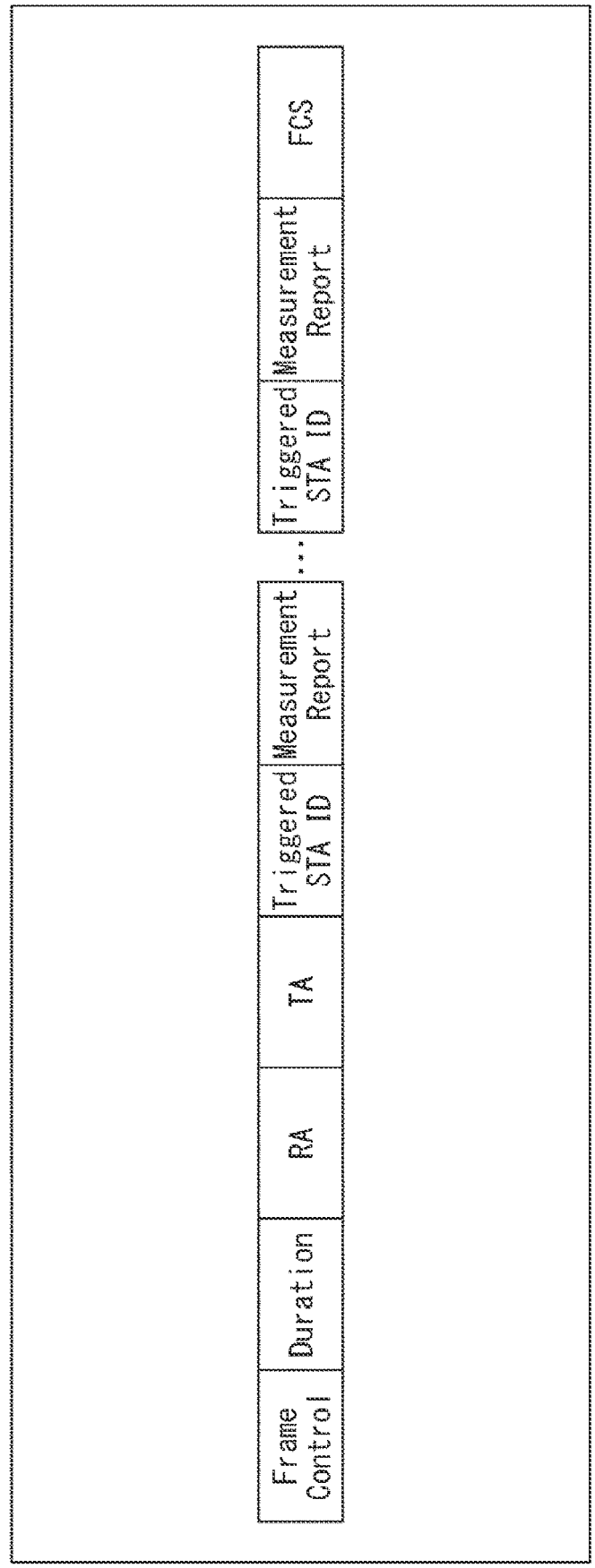
FIG. 8 is a diagram illustrating an example of a measurement response frame.

As an example, the measurement response frame can have a configuration shown in, for example, FIG. 8. In the example shown in FIG. 8, the measurement response frame is provided with a set of a field indicated by characters "Triggered STA ID" and a field indicated by characters "Measurement Report", the number of sets being the number of stations that have transmitted the trigger response frame.

The field indicated by characters "Triggered STA ID" stores identification information indicating a station that has transmitted the trigger response frame. In addition, the field indicated by characters "Measurement Report" stores distance indicator information obtained by the measurement processing related to the trigger response frame transmitted from the station.

Therefore, in the example shown in FIG. 6, for each of the station STA1 and the station STA2, a set of the identification information and the distance indicator information is stored in the measurement response frame.

Here, any kind of information that can identify a station may be used as the identification information. However, for example, sender information included in the measurement request frame can be used as the identification information as it is.

As described above, the trigger body of the measurement request frame shown in FIG. 7 includes contents of the trigger frame transmitted to the station just as they are.

In other words, for each of the station STA1 and the station STA2, the trigger body includes sender information indicating a station, and resource information indicating a resource used by the station.

Therefore, from a frequency resource and a space resource of a received trigger response frame, the access point AP B is capable of identifying sender information indicating a station that has transmitted the trigger response frame.

Accordingly, the access point AP B treats the sender information that has been identified from the received trigger response frame as the identification information of the trigger response frame just as it is, and then stores the sender information in the measurement response frame by being associated with the identification information and distance indicator information.

The access point AP A that receives the measurement response frame also knows correspondence relationship between a station under the control of the access point AP A itself and sender information (identification information), and therefore the access point AP A is capable of grasping which station has the distance indicator information that is associated with the identification information.

Incidentally, at the access point AP A, resources, in other words, a frequency resource and a space resource, which are used by a station under the control of the access point AP A itself to transmit a trigger response frame, are known. Accordingly, resource information indicating resources of a trigger response frame may be used as identification information.

In this case as well, the access point AP A that receives the measurement response frame is capable of grasping which station has the distance indicator information that is associated with the resource information as the identification information.

Returning to the explanation of FIG. 6, when the access point AP A receives the measurement response frame that has been transmitted from the access point AP B, as shown with an arrow Q46, the access point AP A makes a decision (Handover Decision) as to whether or not to perform handover of a station under the control of the access point AP A itself.

At the time of the decision as to whether or not to perform handover, the access point AP A determines a connection destination of each station on the basis of information related to a relative distance to the station under the control viewing from the access point AP A itself, and the received distance indicator information.

Here, distance indicator information can be used as the information related to the relative distance to the station.

For example, the trigger response frame that has been transmitted in the timing shown with the arrow Q43 is received by the access point AP A.

Accordingly, the access point AP A also performs measurement processing similar to that performed at the access point AP B, and consequently distance indicator information can be generated. It is considered that this distance indicator information is similar to information obtained at the access point AP B, the information including, for example, reception intensity, the reception time of the trigger response frame, an error property at the time of receiving the trigger response frame, and the like.

It should be noted that hereinafter, the distance indicator information obtained by the measurement processing at the access point AP A is also particularly referred to as "distance indicator information DI A", and the distance indicator information obtained by the measurement processing at the access point AP B is also particularly referred to as "distance indicator information DI B".

At the time of the decision as to whether or not to perform handover, for example, the access point AP A determines the optimum connection destination of each station by comparing the distance indicator information DI A with the distance indicator information DI B for each station under the control of the access point AP A itself. In other words, optimization of connection destinations is performed.

As an example, a case where distance indicator information is reception intensity will be described.

In this case, the access point AP A makes a comparison between the distance indicator information DI A and the distance indicator information DI B, which have been obtained for the station STA1. As the result, it is revealed that the distance indicator information DI A is longer than the distance indicator information DI B. In other words, it is revealed that the station STA1 is located at a position that is nearer to the access point AP A than the access point AP B.

Meanwhile, the access point AP A makes a comparison between the distance indicator information DI A and the distance indicator information DI B, which have been obtained for the station STA2, and as the result, it is revealed that the distance indicator information DI A is shorter than the distance indicator information DI B. In other words, it is revealed that the station STA2 is located at a position that is nearer to the access point AP B than the access point AP A.

Accordingly, the access point AP A keeps the access point AP A unchanged as the connection destination of the station STA1 located at a position that is nearer to the access point AP A itself, and changes the connection destination of the station STA2 located at a position that is nearer to the access point AP B than the access point AP A itself to the access point AP B.

In other words, in this example, the access point AP A determines, from the current connection relationship, that with respect to the station STA2, making a reconnection to the adjacent access point AP B enables more effective utilization of frequency resources, and consequently the access point AP A changes the connection destination of the station STA2.

When the connection destination is determined in this manner, as shown with an arrow Q47, the access point AP A transmits a trigger frame that induces transmission of an association request frame (Association Request), which is a connection request signal, to the station STA2, the connection destination of which is changed, as a destination of the trigger frame.

It should be noted that hereinafter the trigger frame that induces transmission of an association request frame is also particularly referred to as "association trigger frame".

This association trigger frame is a connection request inducing signal that gives an instruction on transmission of an association request frame, which is a connection request signal requesting connection to an access point that has been determined as a new connection destination.

In the example shown in FIG. 6, type information included in the association trigger frame is information indicating an association request frame, and sender information is information indicating the station STA2. Moreover, the association trigger frame includes, as connection destination information, information indicating a connection destination, in other words, information indicating a transmission destination (destination) of the association request frame. In particular, in this example, the connection destination information is information indicating the access point AP B.

Such an association trigger frame is a signal that prompts the station STA2 to reconnect to the access point AP B, and thus the access point AP A is capable of managing connection of a station by using the association trigger frame. In other words, the access point AP A is capable of designating a connection destination of a station by using the association trigger frame.

It should be noted that in the timing shown with the arrow Q47, concurrently with the transmission of the association trigger frame by the access point AP A, the access point AP A may transmit beforehand, to the access point AP B that serves as a new connection destination of the station STA2, a signal indicating that the access point AP B has been determined as the connection destination of the station STA2, and indicating a reason for the determination and the like.

Besides the above, before the access point AP A transmits the association trigger frame, the access point AP A may communicate with the access point AP B beforehand to negotiate with the access point AP B as to whether or not to change the connection destination of the station STA2.

When the station STA2 receives the association trigger frame including such connection destination information, as shown with an arrow Q48, the station STA2 generates an association request frame in response to the association trigger frame, and then transmits the association request frame to the access point AP B. This association request frame is a connection request signal indicating that the access point AP B indicated by connection destination information is designated as a destination, and accordingly requesting connection to the access point AP B.

When the access point AP B receives the association request frame transmitted from the station STA2 as shown with an arrow Q49, the access point AP B performs association processing (Association) according to the association request frame.

For example, in the association processing, after the station STA2 is authenticated as necessary, the access point AP B transmits an association response frame (Association Response), which is a response indicating that connection is permitted, to the station STA2.

As the result of such association processing, the connection destination of the station STA2 has been changed from the access point AP A to the access point AP B.

As the result, for example, the packet sequence shown on the lower side of FIG. 2 is executed, and consequently frequency resources can be more effectively utilized.

As described above, by introducing the mechanism described with reference to FIGS. 6 to 8, only changing an access point, or only performing software extension of a station, enables handover between access points to be easily realized. In other words, connection of each station to an appropriate access point is realized, and thereby frequency resources can be effectively utilized.

<Configuration Example of Wireless Communication Device>

Subsequently, a specific configuration example of a wireless communication device corresponding to the access point AP A, the access point AP B, the station STA1, and the station STA2 described above will be described.

Figure 9:
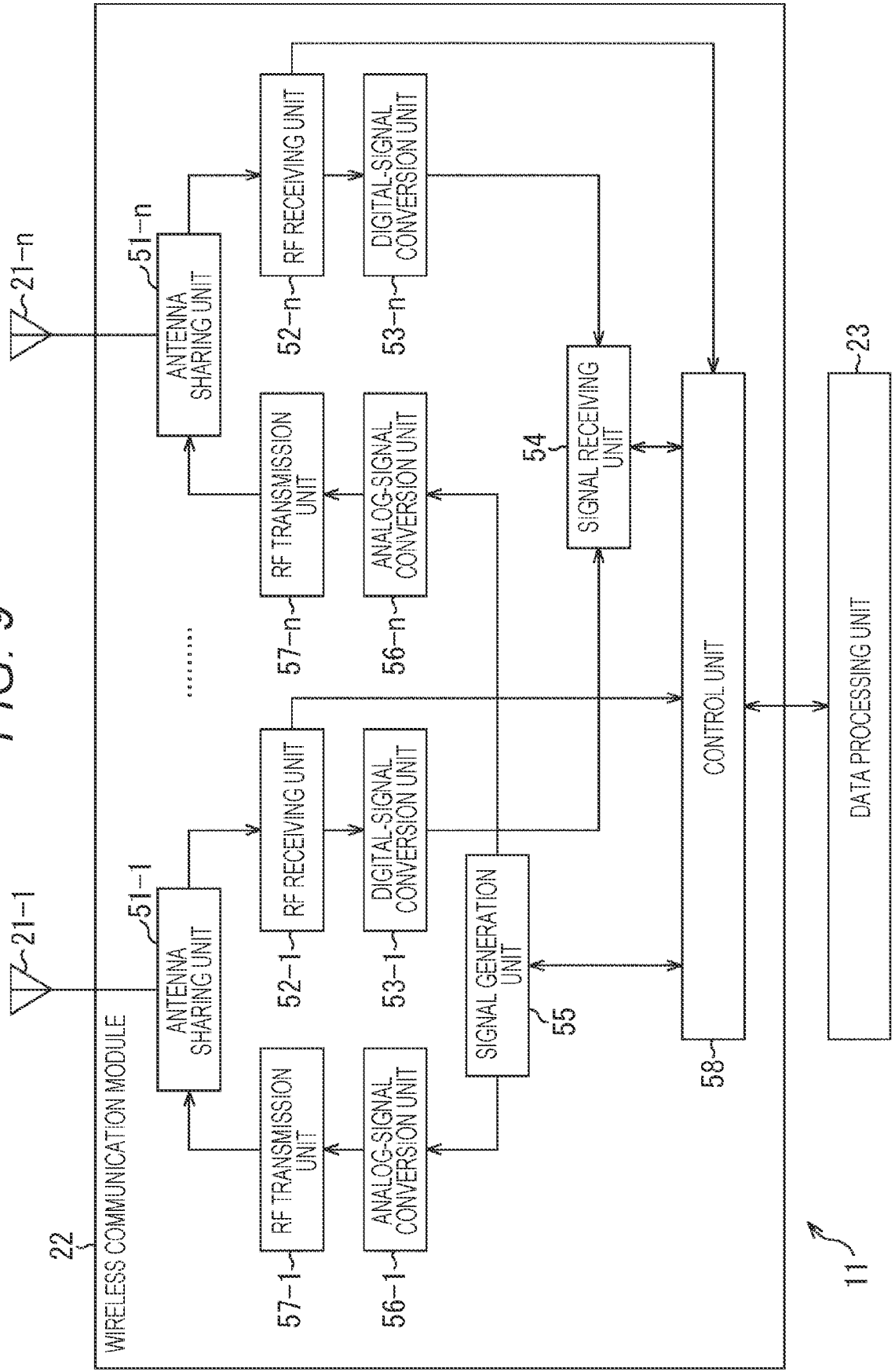
FIG. 9 is a diagram illustrating a configuration example of a wireless communication device.

FIG. 9 is a diagram illustrating a configuration example of a wireless communication device to which the present technology is applied.

A wireless communication device 11 shown in FIG. 9 functions as an access point or a station that wirelessly communicates with other wireless communication devices.

The wireless communication device 11 includes antennas 21-1 to 21-$n$, a wireless communication module 22, and a data processing unit 23.

The antennas 21-1 to 21-$n$ each wirelessly transmit various kinds of signals (frames) supplied from the wireless communication module 22.

In addition, the antennas 21-1 to 21-$n$ each receive a signal (frame) that has been wirelessly transmitted, and each supply the signal to the wireless communication module 22.

It should be noted that hereinafter, in a case where it is not particularly necessary to distinguish among the antennas 21-1 to 21-$n$, the antennas 21-1 to 21-$n$ are also merely referred to as "antenna 21".

The wireless communication module 22 includes, for example, a semiconductor chip and the like, and while giving/receiving information to/from the data processing unit 23, the wireless communication module 22 supplies various kinds of signals (frames) to the antenna 21 to cause the antenna 21 to transmit the signals, and performs processing corresponding to a signal received by the antenna 21, as appropriate.

The data processing unit 23 extracts various information from the signal supplied from the wireless communication module 22, and supplies the extract information, generated information, or the like to the wireless communication module 22.

In addition, the wireless communication module 22 includes antenna sharing units 51-1 to 51-$n$, RF receiving units 52-1 to 52-$n$, digital-signal conversion unit 53-1 to 53-$n$, a signal receiving unit 54, a signal generation unit 55, analog-signal conversion units 56-1 to 56-$n$, RF transmission units 57-1 to 57-$n$, and a control unit 58.

These components from the antenna sharing unit 51-1 to the control unit 58, which constitute the wireless communication module 22, are laminated on, for example, one semiconductor chip.

The antenna sharing units 51-1 to 51-$n$ are switches, each of which switches between transmission and receiving.

In other words, the antenna sharing units 51-1 to 51-$n$ supply signals (frames) supplied from the RF transmission units 57-1 to 57-$n$ to the antennas 21-1 to 21-$n$ respectively, and supply signals (frames) supplied from the antennas 21-1 to 21-$n$ to the RF receiving units 52-1 to 52-$n$ respectively.

It should be noted that hereinafter, in a case where it is not particularly necessary to distinguish among the antenna sharing units 51-1 to 51-$n$, the antenna sharing units 51-1 to 51-$n$ are also merely referred to as "antenna sharing unit 51".

The RF receiving units 52-1 to 52-$n$ each include, for example, a low-noise amplifier, an Auto Gain Control (AGC) unit, a frequency converter, a filter, and the like; and the RF receiving units 52-1 to 52-$n$ receive signals by the antenna 21 through the antenna sharing units 51-1 to 51-$n$ respectively.

The RF receiving units 52-1 to 52-$n$ subject the received signals to various kinds of processing such as amplification processing, gain adjustment processing, frequency conversion processing, and filter processing as appropriate, and then supply signals obtained as the result thereof to the digital-signal conversion units 53-1 to 53-$n$ respectively.

In addition, the RF receiving units 52-1 to 52-$n$ also determine, for example, reception intensities of the received signals, and supply the reception intensities to the control unit 58 respectively, as necessary.

It should be noted that hereinafter, in a case where it is not particularly necessary to distinguish among the RF receiving units 52-1 to 52-$n$, the RF receiving units 52-1 to 52-$n$ are also merely referred to as "RF receiving unit 52".

The digital-signal conversion units 53-1 to 53-$n$ handle signals supplied from the RF receiving units 52-1 to 52-$n$ to perform conversion from analog signals to digital signals by Analog Digital (AD) conversion, and supply the digital signals to the signal receiving unit 54.

It should be noted that hereinafter, in a case where it is not particularly necessary to distinguish among the digital-signal conversion units 53-1 to 53-$n$, the digital-signal conversion units 53-1 to 53-$n$ are also merely referred to as "digital-signal conversion unit 53".

The signal receiving unit 54 subjects the signals supplied from the digital-signal conversion unit 53 to various kinds of processing such as demodulation and decoding according to control of the control unit 58, and supplies signals obtained as a result thereof to the control unit 58.

The control unit 58 controls operation of the wireless communication device 11 as a whole. For example, the control unit 58 supplies a signal supplied from the signal receiving unit 54 to the data processing unit 23, and supplies information supplied from the data processing unit 23 to the signal generation unit 55.

The signal generation unit 55 performs encoding processing or the like on the basis of information or the like supplied from the control unit 58 to generate a signal in a predetermined format, then subjects the generated signal to modulation processing, and subsequently supplies the modulated signal to the analog-signal conversion units 56-1 to 56-$n$.

The analog-signal conversion units 56-1 to 56-$n$ handle signals supplied from the signal generation unit 55 to perform conversion from digital signals to analog signals by Digital Analog (DA) conversion, and supply the converted signals to the RF transmission units 57-1 to 57-$n$.

It should be noted that hereinafter, in a case where it is not particularly necessary to distinguish among the analog-signal conversion units 56-1 to 56-*n*, the analog-signal conversion units 56-1 to 56-*n* are also merely referred to as "analog-signal conversion unit 56".

The RF transmission units 57-1 to 57-*n* each include, for example, a frequency converter, an amplifier, a filter, and the like. The RF transmission units 57-1 to 57-*n* subject signals supplied from the analog-signal conversion units 56-1 to 56-*n* to frequency conversion processing, amplification processing, filter processing, and the like, and then supply the signals to the antenna 21-1 to 21-*n* through the antenna sharing units 51-1 to 51-*n* so as to cause the antenna 21-1 to 21-*n* to transmit the signals.

It should be noted that hereinafter, in a case where it is not particularly necessary to distinguish among the RF transmission units 57-1 to 57-*n*, the RF transmission units 57-1 to 57-*n* are also merely referred to as "RF transmission unit 57".

<About Connection-Destination Determination Processing>

Next, operation of the wireless communication device 11 shown in FIG. 9 will be described.

First of all, connection-destination determination processing in which the wireless communication device 11 that is an access point optimizes connection destinations of stations under the control of the wireless communication device 11 itself will be described.

In other words, connection-destination determination processing performed by the wireless communication device 11 will be described below with reference to a flowchart shown in FIG. 10. It should be noted that in this case, the wireless communication device 11 corresponds to the access point AP A described with reference to FIG. 6.

In step S11, the RF transmission unit 57 transmits a measurement request frame by using the antenna 21.

In other words, the control unit 58 supplies sender information indicating each station under the control of the wireless communication device 11, received power information, resource information, type information, trigger delay amount information, and the like to the signal generation unit 55, and gives an instruction on generation of the measurement request frame.

Consequently, on the basis of the sender information, the received power information, the resource information, the type information, the trigger delay amount information, and the like, which have been supplied from the control unit 58, the signal generation unit 55 generates a measurement request frame having a configuration shown in FIG. 7. At this point, a trigger body of the measurement request frame is adapted to include, for example, a trigger frame as it is, the trigger frame being transmitted in the undermentioned step S12.

In addition, the signal generation unit 55 subjects the generated measurement request frame to modulation processing and the like, and then supplies the modulated measurement request frame to the analog-signal conversion unit 56.

The analog-signal conversion unit 56 subjects the measurement request frame supplied from the signal generation unit 55 to digital-to-analog conversion, and then supplies the converted measurement request frame to the RF transmission unit 57. The RF transmission unit 57 subjects the measurement request frame supplied from the analog-signal conversion unit 56 to frequency conversion processing, amplification processing, filter processing, and the like as appropriate, and then outputs the measurement request frame to the antenna 21 through the antenna sharing unit 51 so as to transmit the measurement request frame.

In step S12, the RF transmission unit 57 transmits a trigger frame by using the antenna 21.

In other words, the control unit 58 supplies sender information indicating each station under the control of the wireless communication device 11, received power information, resource information, type information, and the like to the signal generation unit 55, and gives an instruction on generation of a trigger frame.

Consequently, on the basis of the sender information, the received power information, the resource information, the type information, and the like, which have been supplied from the control unit 58, the signal generation unit 55 generates a trigger frame having a configuration shown in FIG. 3. Subsequently, the signal generation unit 55 subjects the generated trigger frame to modulation processing and the like, and supplies the trigger frame to the RF transmission unit 57 through the analog-signal conversion unit 56.

The RF transmission unit 57 subjects the trigger frame supplied from the analog-signal conversion unit 56 to frequency conversion processing and the like as appropriate, and then outputs the trigger frame to the antenna 21 through the antenna sharing unit 51 so as to transmit the trigger frame.

When the trigger frame is transmitted in this manner, a station that has received the trigger frame transmits a trigger response frame, and therefore the wireless communication device 11 receives the trigger response frame.

In other words, the RF receiving unit 52 receives the trigger response frame through the antenna sharing unit 51 and the antenna 21, and supplies the received trigger response frame to the control unit 58 through the digital-signal conversion unit 53 and the signal receiving unit 54.

In step S13, the wireless communication device 11 grasps a propagation status of a signal (frame) in the wireless communication device 11's own BSS. In other words, in step S13, measurement processing is performed, and distance indicator information that is information related to a relative distance between the wireless communication device 11 and the station is generated. Here, processing similar to that in step S83 of FIG. 12 described below is performed as the measurement processing.

For example, the RF receiving unit 52 determines reception intensity of the trigger response frame on the basis of the received trigger response frame, and supplies the obtained reception intensity to the control unit 58 as distance indicator information. In this case, the RF receiving unit 52 functions as a measurement unit that performs measurement processing.

It should be noted that when a plurality of stations exists under the control of the wireless communication device 11, the RF receiving unit 52 receives trigger response frames transmitted from those stations. However, since resources used to transmit those trigger response frames differ from each other, the RF receiving unit 52 is capable of obtaining reception intensity on a trigger response frame basis by separating the plurality of trigger response frames.

Besides the above, for example, the RF receiving unit 52 may generate the reception time of the trigger response frame as distance indicator information, or may generate the time (delay amount) from the transmission time to the reception time of the trigger response frame as distance indicator information. In addition, the RF receiving unit 52 may generate the time (delay amount) from the transmission time of the measurement request frame to the reception time of the trigger response frame as distance indicator information. In these cases, the RF receiving unit 52 functions as a measurement unit that performs measurement processing.

Moreover, the data processing unit 23 may generate a receiving error rate of the trigger response frame, in other words, an error property, as distance indicator information. In this case, the data processing unit 23 functions as the measurement unit that performs measurement processing.

In a case where the receiving error rate is generated as distance indicator information, the control unit 58 supplies the trigger response frame supplied from the signal receiving unit 54 to the data processing unit 23, and causes the data processing unit 23 to calculate the receiving error rate.

On the basis of a frame check sequence included in the trigger response frame supplied from the control unit 58, the data processing unit 23 performs computation for checking whether or not the trigger response frame has been correctly received, and calculates the receiving error rate from the computation result.

The receiving error rate obtained in this manner is obtained from the data processing unit 23 as distance indicator information by the control unit 58.

The distance indicator information including the reception intensity, the reception time, and the receiving error rate such as those described above is information that serves as an indicator indicating a distance from an access point to a station. However, it can also be said that the distance indicator information is information indicating a propagation status of the trigger response frame that has been given/received between the access point and the station. This is because it can be said that, for example, when reception intensity is sufficiently large, or when a receiving error rate is low, a propagation status of a trigger response frame is excellent.

In addition, when a trigger response frame is transmitted by a station, an access point that has received the trigger response frame and the measurement request frame transmits a measurement response frame in response to the measurement request frame.

In step S14, the RF receiving unit 52 receives the measurement response frame through the antenna sharing unit 51 and the antenna 21, and supplies the measurement response frame to the control unit 58 through the digital-signal conversion unit 53 and the signal receiving unit 54. Consequently, the measurement response frame having the configuration shown in, for example, FIG. 8 is received.

In step S15, the control unit 58 causes identification information and distance indicator information to be read from the measurement response frame.

In other words, the control unit 58 supplies the measurement response frame, which has been supplied from the signal receiving unit 54, to the data processing unit 23, and instructs the data processing unit 23 to read the identification information and the distance indicator information from the measurement response frame.

Consequently, the data processing unit 23 reads one set of identification information and distance indicator information from the measurement response frame, and then supplies the set to the control unit 58.

It can be said that the distance indicator information that has been read in this manner is information indicating an indicator of a distance between an access point and a station, in other words, information indicating a propagation status of a signal between the access point and the station.

In step S16, the control unit 58 compares the propagation status grasped in step S13 with the propagation status identified by the distance indicator information that has been read in step S15.

In other words, the control unit 58 treats a station, which is indicated by the identification information read in step S15, as a station that is a processing target, and for the station, the control unit 58 compares the distance indicator information obtained in step S13 with the distance indicator information read in step S15.

As the result, positional relationship among the wireless communication device 11, an access point that is a sender of a measurement response frame, and a station that is a processing target is identified. In other words, which is a more excellent propagation status is identified from between: a propagation status of a signal between the wireless communication device 11 and a station that is a processing target; and a propagation status of a signal between an access point that is a sender of the measurement response frame and a station that is a processing target.

In step S17, on the basis of a result of the comparison in step S16, the control unit 58 decides whether or not to change a connection destination of the station that is the processing target.

For example, in step S17, as the result of the comparison of distance indicator information, in a case where the station that is the processing target is located at a position nearer to the access point that is the sender of the measurement response frame than the wireless communication device 11, it is decided that the connection destination needs to be changed.

In other words, in a case where a propagation status of a signal between the access point that is the sender of the measurement response frame and the station that is the processing target is more excellent than a propagation status of a signal between the wireless communication device 11 and the station that is the processing target, it is decided that handover of the connection destination is performed for the station that is the processing target. In addition, in a case where the connection destination of the station that is the processing target is changed, the control unit 58 also determines an access point that serves as a new connection destination of the station that is the processing target.

By deciding whether or not to change a connection destination in this manner, it can be said that the control unit 58 that performs optimization of connection destinations of stations under control functions as a determining unit that determines a connection destination of a station on the basis of a propagation status of a signal.

In a case where it has been decided, in step S17, that the connection destination does not need to be changed, the process then proceeds to step S19.

Meanwhile, in a case where it has been decided, in step S17, that the connection destination needs to be changed, the process proceeds to step S18. In step S18, the control unit 58 adds a station that is a processing target, and information indicating a new connection destination of the station, to a handover list that is a list of stations, each of which requires handover. When the handover list is updated in this manner, the process then proceeds to step S19.

It should be noted that the control unit 58 resets the handover list at the time of starting the connection-destination determination processing, and updates the maintained handover list every time processing of step S18 is performed.

In a case where the processing of step S18 has been performed, or in a case where it has been decided, in step S17, that the connection destination does not need to be changed, processing of step S19 is performed.

In step S19, the control unit 58 decides whether or not identification information and distance indicator information have been all read from the measurement response frame.

In step S19, in a case where it has been decided that the identification information and the distance indicator information have not yet been all read, the process returns to step S15, and the above-described processing is repeatedly performed.

Meanwhile, in a case where it has been decided, in step S19, that the identification information and the distance indicator information have been all read, a decision as to whether or not to change a connection destination has been made for all stations under control, and therefore the process then proceeds to step S20.

In step S20, on the basis of the maintained handover list, the control unit 58 decides whether or not there is a station, the connection destination of which needs to be changed.

For example, in a case where the handover list includes information indicating a station, it is decided, in step S20, that there is a station, the connection destination of which needs to be changed.

In a case where it has been decided, in step S20, that there is no station, the connection destination of which needs to be changed, change (handover) of a connection destination of a station under the control of the wireless communication device 11 is not performed, and the connection-destination determination processing ends. In this case, it can be said that the optimum connection destination of the station under the control of the wireless communication device 11 has been the wireless communication device 11.

Meanwhile, in a case where it has been decided, in step S20, that there is a station, the connection destination of which needs to be changed, the RF transmission unit 57 transmits an association trigger frame by using the antenna 21 in step S21.

For example, for a station, the connection destination of which needs to be changed, indicated by information included in the handover list, the control unit 58 instructs the signal generation unit 55 to generate an association trigger frame.

At this point, with respect to the station, the connection destination of which needs to be changed, the control unit 58 also supplies the signal generation unit 55 with, for example, sender information, resource information, received power information, type information indicating an association request frame, and connection destination information indicating an access point that is a connection destination.

The signal generation unit 55 generates an association trigger frame that includes, for example, the sender information, the resource information, the received power information, the type information, and the connection destination information, which have been supplied from the control unit 58. Subsequently, the signal generation unit 55 subjects the generated association trigger frame to modulation processing and the like, and supplies the association trigger frame to the RF transmission unit 57 through the analog-signal conversion unit 56.

The RF transmission unit 57 subjects the association trigger frame supplied from the analog-signal conversion unit 56 to frequency conversion processing and the like as appropriate, and then outputs the association trigger frame to the antenna 21 through the antenna sharing unit 51 so as to transmit the association trigger frame.

When the association trigger frame is transmitted, the connection-destination determination processing ends. It should be noted that when the association trigger frame is transmitted, a signal related to association is then transmitted/received between the station and the access point indicated by the connection destination information, and consequently the connection destination of the station is changed.

As described above, the wireless communication device 11 transmits a measurement request frame, and receives a measurement response frame transmitted in response thereto. Subsequently, on the basis of the received measurement response frame, the wireless communication device 11 decides whether or not to change a connection destination of a station under control, and thereby optimizes connection destinations.

Performing the above processing in such a manner enables the wireless communication device 11, which is an access point, to take the initiative in determining an appropriate connection destination as a connection destination of a station, and therefore frequency resources can be more effectively utilized.

<About Connection-Destination Changing Processing>

Next, operation of the wireless communication device 11 functioning as a station that receives a trigger frame transmitted in connection-destination determination processing of FIG. 10 will be described. In other words, connection-destination changing processing performed by the wireless communication device 11 will be described below with reference to a flowchart shown in FIG. 11. In this case, the wireless communication device 11 corresponds to the station STA1 and the station STA2 described with reference to FIG. 6.

In step S51, the RF receiving unit 52 receives a trigger frame through the antenna sharing unit 51 and the antenna 21, and supplies the trigger frame to the control unit 58 through the digital-signal conversion unit 53 and the signal receiving unit 54. Consequently, a trigger frame that has been transmitted in, for example, step S12 of FIG. 10 is received, the trigger frame having a configuration shown in FIG. 3.

From sender information and type information included in the trigger frame supplied from the signal receiving unit 54, the control unit 58 is capable of grasping that the wireless communication device 11 is instructed to transmit a trigger response frame.

The control unit 58 supplies required information to the signal generation unit 55, and instructs the signal generation unit 55 to generate a trigger response frame, as appropriate. Consequently, the signal generation unit 55 generates the trigger response frame according to the instruction of the control unit 58, subjects the trigger response frame to modulation processing and the like, and supplies the trigger response frame to the RF transmission unit 57 through the analog-signal conversion unit 56.

At this point, the signal generation unit 55 generates a trigger response frame in such a manner that the trigger response frame is transmitted by using a frequency resource and a space resource indicated by resource information included in the trigger frame.

In step S52, the RF transmission unit 57 transmits a trigger response frame supplied from the analog-signal conversion unit 56 by using the antenna 21.

In other words, the RF transmission unit 57 subjects the trigger response frame supplied from the analog-signal conversion unit 56 to frequency conversion processing and the like as appropriate, and then outputs the trigger response frame to the antenna 21 through the antenna sharing unit 51 so as to transmit the trigger response frame.

At this point, the control unit 58 controls transmission performed by the RF transmission unit 57 in such a manner that a trigger response frame is transmitted by transmission power defined by trigger frame transmission power information and received power information, which are included in the trigger frame received in step S51. It should be noted that in more detail, the transmission power for transmitting the trigger response frame is defined on the basis of trigger frame transmission power information, received power information, and received power at the time of receiving the trigger frame.

Figure 12:
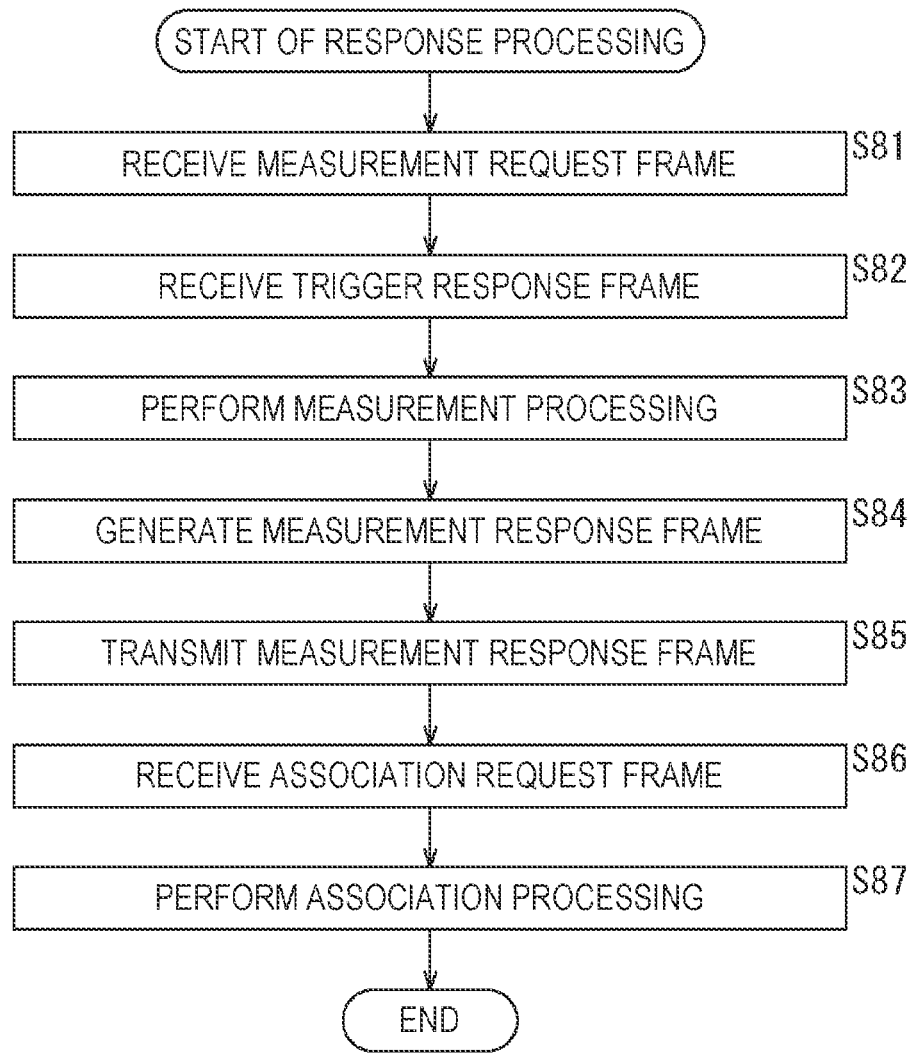
FIG. 12 is a flowchart illustrating response processing.

The trigger response frame that has been transmitted in this manner is received by the access point that is the connection destination of the wireless communication device 11, and is used for processing in step S13 of FIG. 10, or is received in step S82 of FIG. 12 described later, step S82 being executed by an access point that is not a connection destination of the wireless communication device 11.

In addition, when a trigger response frame is transmitted, an association trigger frame is then transmitted from an access point that serves as a connection destination as necessary. In other words, in a case where the connection destination of the wireless communication device 11 is changed, an association trigger frame is transmitted from an access point.

In step S53, the control unit 58 decides whether or not to change the connection destination of the wireless communication device 11. In other words, in step S53, in a case where an association trigger frame has been transmitted to the wireless communication device 11, it is decided that the connection destination needs to be changed.

In a case where it has been decided, in step S53, that the connection destination does not need to be changed, the connection-destination changing processing ends without executing processing of step S54 and processing of step S55.

Meanwhile, in a case where it has been decided that the connection destination needs to be changed, the process then proceeds to step S54.

In step S54, the RF receiving unit 52 receives the association trigger frame through the antenna sharing unit 51 and the antenna 21, and supplies the association trigger frame to the control unit 58 through the digital-signal conversion unit 53 and the signal receiving unit 54. This association trigger frame has been transmitted by processing in step S21 of FIG. 10 by using an access point that is a connection destination of the wireless communication device 11 at the present point of time.

When the association trigger frame is supplied from the signal receiving unit 54, the control unit 58 instructs the signal generation unit 55 to generate an association request frame that requests connection to an access point indicated by connection destination information included in the association trigger frame. At this point, the control unit 58 supplies required information including connection destination information and the like to the signal generation unit 55.

The signal generation unit 55 generates an association request frame on the basis of, for example, the connection destination information supplied from the control unit 58, subjects the association request frame to modulation processing and the like, and then supplies the association request frame to the RF transmission unit 57 through the analog-signal conversion unit 56.

In step S55, the RF transmission unit 57 transmits the association request frame by using the antenna 21.

In other words, the RF transmission unit 57 subjects the association request frame supplied from the analog-signal conversion unit 56 to frequency conversion processing and the like as appropriate, and then outputs the association request frame to the antenna 21 through the antenna sharing unit 51 so as to transmit the association request frame.

When the association request frame is transmitted, a signal related to association is then transmitted/received between the wireless communication device 11 and the access point indicated by the connection destination information, and consequently the connection destination of the wireless communication device 11 is changed. Subsequently, when the connection destination of the wireless communication device 11 is changed, the connection-destination changing processing ends.

As described above, the wireless communication device 11 transmits a trigger response frame in response to a received trigger frame, and when an association trigger frame is received, the wireless communication device 11 transmits an association request frame in response thereto, and changes a connection destination.

By performing the processing in such a manner, the wireless communication device 11 is capable of connecting to an appropriate connection destination on the basis of control by an access point. Consequently, frequency resources can be more effectively utilized.

<About Response Processing>

Moreover, operation of the wireless communication device 11 functioning as an access point that receives a measurement request frame transmitted in the connection-destination determination processing of FIG. 10 will be described. In other words, response processing performed by the wireless communication device 11 will be described below with reference to a flowchart shown in FIG. 12. In this case, the wireless communication device 11 corresponds to the access point AP B described with reference to FIG. 6.

In step S81, the RF receiving unit 52 receives a measurement request frame through the antenna sharing unit 51 and the antenna 21, and supplies the measurement request frame to the control unit 58 through the digital-signal conversion unit 53 and the signal receiving unit 54. Consequently, a measurement request frame that has been transmitted in, for example, step S11 of FIG. 10 is received, the measurement request frame having a configuration shown in FIG. 7.

Figure 11:
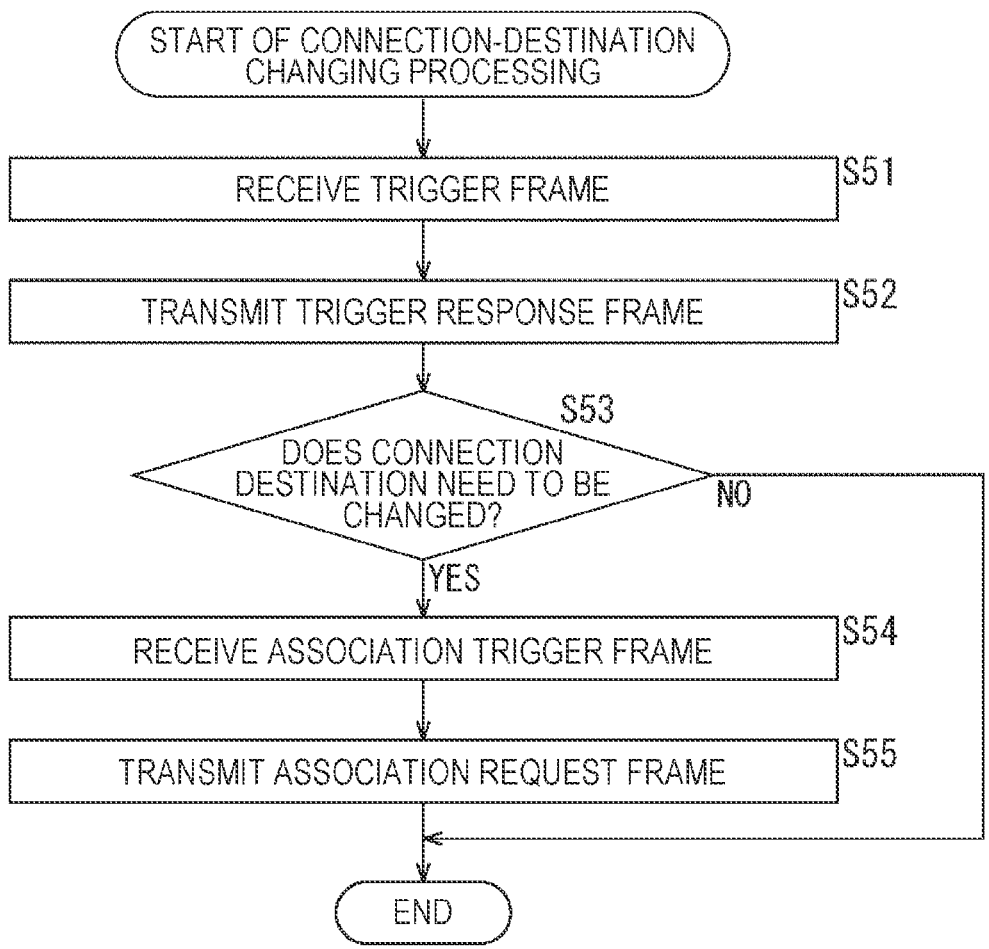
FIG. 11 is a flowchart illustrating connection-destination changing processing.

The measurement request frame is received, and subsequently, processing in step S52 of FIG. 11 is performed after the lapse of time defined by trigger delay amount information included in the measurement request frame, and consequently a trigger response frame is transmitted.

In step S82, the RF receiving unit 52 receives a trigger response frame through the antenna sharing unit 51 and the antenna 21, and supplies the trigger response frame to the control unit 58 through the digital-signal conversion unit 53 and the signal receiving unit 54.

It should be noted that in step S82, trigger response frames transmitted from one or a plurality of stations are received. As described above, trigger response frames transmitted from respective stations differ in at least one of a frequency resource or a space resource used at the time of transmission, and therefore the wireless communication device 11 is capable of separating the plurality of trigger response frames.

In step S83, on a received trigger response frame basis, that is to say, on a station basis, the wireless communication device 11 performs measurement processing for obtaining distance indicator information indicating an indicator of a relative distance between the wireless communication device 11 and a station.

In other words, on the basis of the receiving timing of the trigger response frame, or on the basis of the received trigger response frame, measurement processing for obtaining distance indicator information indicating a propagation status of a signal between the wireless communication device 11 and a station is performed.

For example, the RF receiving unit 52 determines reception intensity of the trigger response frame on the basis of the received trigger response frame, and supplies the obtained reception intensity to the control unit 58 as distance indicator information. In this case, the RF receiving unit 52 functions as a measurement unit that measures reception intensity of the trigger response frame as measurement processing related to a propagation status of a signal.

Besides the above, for example, the RF receiving unit 52 may generate the reception time of the trigger response frame as distance indicator information, or may generate the time (delay amount) from the transmission time of the trigger response frame to the reception time of the trigger response frame as distance indicator information. In addition, for example, the RF receiving unit 52 may generate the time (delay amount) from the reception time of the measurement request frame to the reception time of the trigger response frame as distance indicator information. In these cases, the RF receiving unit 52 functions as a measurement unit that measures the reception time and the delay amount on the basis of the receiving timing of the trigger response frame as measurement processing.

Moreover, for example, the data processing unit 23 may generate a receiving error rate of the trigger response frame as distance indicator information.

In a case where the receiving error rate is generated as distance indicator information, the control unit 58 supplies the trigger response frame supplied from the signal receiving unit 54 to the data processing unit 23, and causes the data processing unit 23 to calculate the receiving error rate.

On the basis of a frame check sequence included in the trigger response frame supplied from the control unit 58, the data processing unit 23 performs computation for checking whether or not the trigger response frame has been correctly received, and calculates the receiving error rate from the computation result.

The receiving error rate obtained in this manner is obtained from the data processing unit 23 as distance indicator information by the control unit 58. In this case, the data processing unit 23 functions as a measurement unit that measures a receiving error rate, that is to say, an error property, on the basis of the trigger response frame as measurement processing related to a propagation status of a signal.

The control unit 58 supplies distance indicator information obtained in this manner, and identification information corresponding to the distance indicator information, to the signal generation unit 55, and instructs the signal generation unit 55 to generate a measurement response frame.

Here, for example, sender information included in a trigger body of the measurement request frame received in step S81 may be used as identification information, or resource information included in the trigger body may be used as identification information.

In step S84, the signal generation unit 55 generates a measurement response frame on the basis of the distance indicator information and the identification information supplied from the control unit 58. Consequently, the measurement response frame having the configuration shown in, for example, FIG. 8 is generated.

In addition, the signal generation unit 55 subjects the generated measurement response frame to modulation processing and the like, and supplies the measurement response frame to the RF transmission unit 57 through the analog-signal conversion unit 56.

In step S85, the RF transmission unit 57 transmits the measurement response frame supplied from the analog-signal conversion unit 56 by using the antenna 21.

In other words, the RF transmission unit 57 subjects the measurement response frame supplied from the analog-signal conversion unit 56 to frequency conversion processing and the like as appropriate, and then outputs the measurement response frame to the antenna 21 through the antenna sharing unit 51 so as to transmit the measurement response frame.

Figure 10:
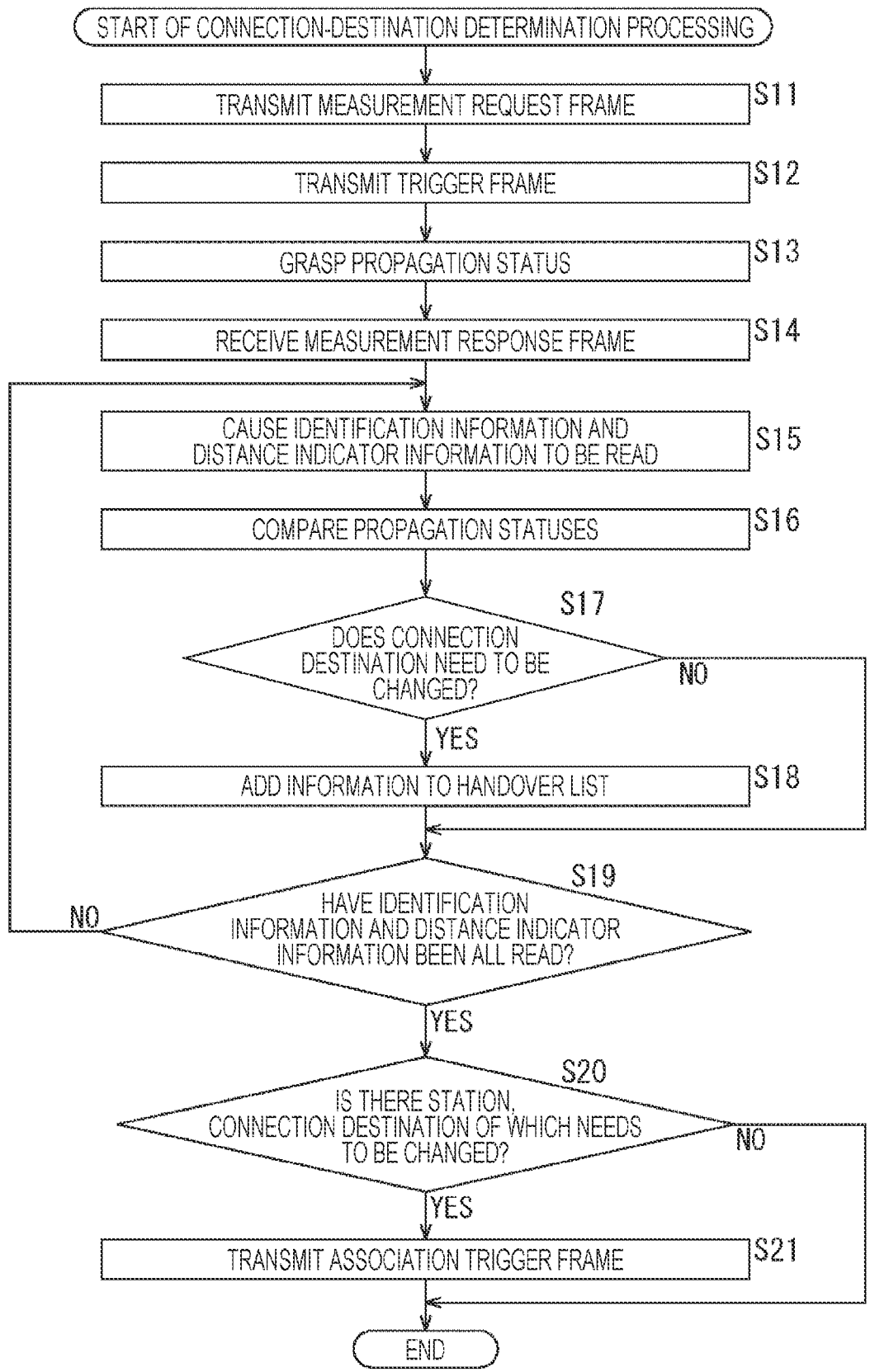
FIG. 10 is a flowchart illustrating connection-destination determination processing.

The measurement response frame that has been transmitted in this manner is received by the processing in step S14 of FIG. 10 by using an access point that is a sender of the measurement request frame.

Consequently, the access point that is the sender of the measurement request frame transmits an association trigger frame as appropriate, and therefore a station that has received the association trigger frame transmits an association request frame to the wireless communication device 11. This association request frame is the one that has been transmitted by the processing in step S55 of FIG. 11.

In step S86, the RF receiving unit 52 receives the association request frame through the antenna sharing unit 51 and the antenna 21, and supplies the association request frame to the control unit 58 through the digital-signal conversion unit 53 and the signal receiving unit 54.

In step S87, the wireless communication device 11 performs association processing according to the received association request frame.

For example, in the association processing, necessary processing such as authentication is performed between the wireless communication device 11 and a station.

In addition, when association (connection) of the station is permitted, then according to control of the control unit 58, the signal generation unit 55 generates an association response frame indicating that connection is permitted, and supplies the association response frame to the RF transmission unit 57 through the analog-signal conversion unit 56. Moreover, the RF transmission unit 57 outputs an association response frame, which has been supplied from the analog-signal conversion unit 56, to the antenna 21 through the antenna sharing unit 51, thereby transmitting the association response frame to the station, and consequently connection to the station is established.

The association processing is performed in this manner, and subsequently the response processing ends. It should be noted that in a case where there is no station, the new connection destination of which is the wireless communication device 11, for example, in a case where it has been decided, in step S20 of FIG. 10, that there is no station, the connection destination of which needs to be changed, the processing in step S86 and that in step S87 are not executed.

In a manner described above, the wireless communication device 11 performs measurement processing according to the received measurement request frame, and transmits the measurement response frame that includes a measurement result thereof. By performing the processing in such a manner, the wireless communication device 11 is capable of cooperating with other access points to cause a station around the wireless communication device 11 to connect to an appropriate connection destination, and consequently frequency resources can be more effectively utilized.

<Configuration Example of Computer>

Incidentally, the series of processing described above can be executed by hardware, and can also be executed by software. In a case where the series of processing is executed by software, a program that configures the software is installed in a computer. Here, the computer includes a computer that is built into dedicated hardware, and a computer that is capable of executing various kinds of functions by installing various kinds of programs, for example, a general-purpose personal computer and the like.

Figure 13:
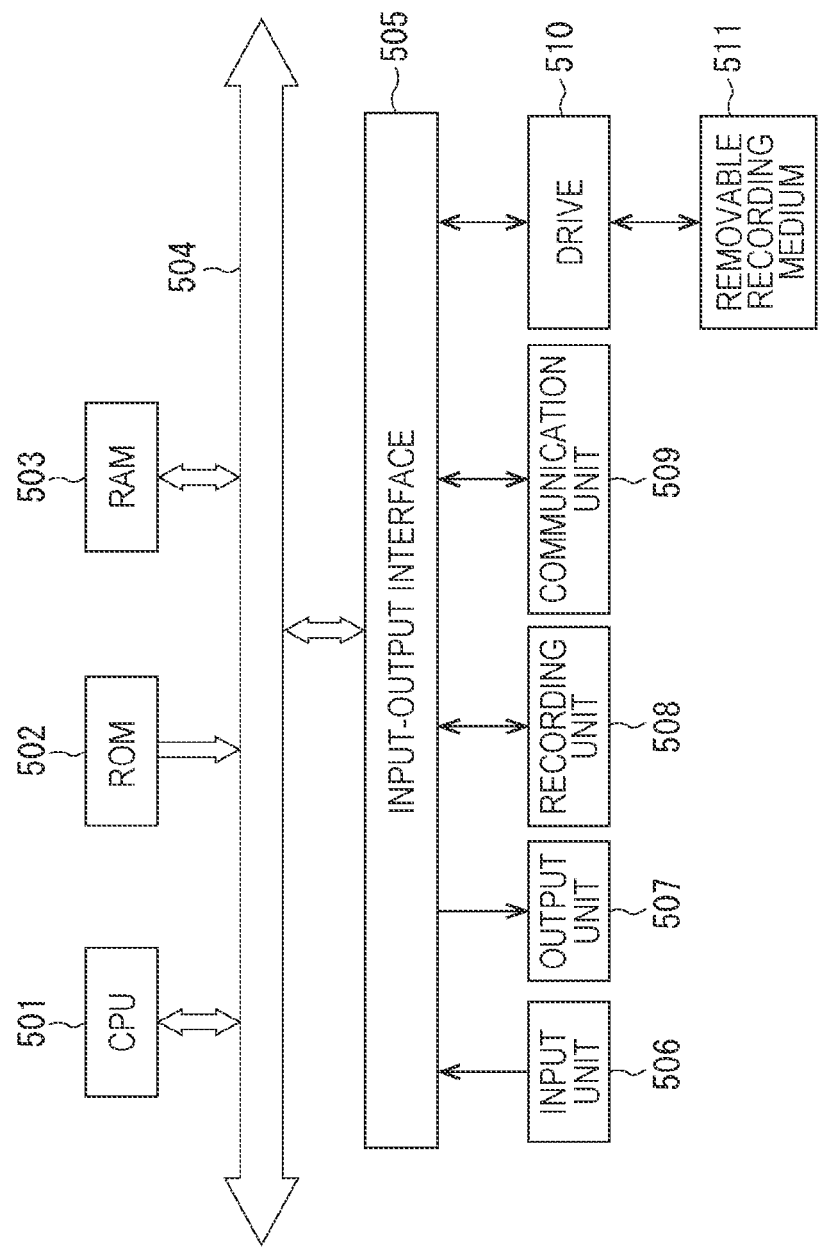
FIG. 13 is a diagram illustrating a configuration example of a computer.

FIG. 13 is a block diagram illustrating a configuration example of hardware of a computer that executes the above-described series of processing by a program.

In the computer, a central processing unit (CPU) 501, a Read Only Memory (ROM) 502, and a random access memory (RAM) 503 are mutually connected through a bus 504.

An input-output interface 505 is further connected to the bus 504. An input unit 506, an output unit 507, a recording unit 508, a communication unit 509, and a drive 510 are connected to the input-output interface 505.

The input unit 506 includes a keyboard, a mouse, a microphone, an image pickup element, and the like. The output unit 507 includes a display, a speaker, and the like. The recording unit 508 includes a hard disk, a nonvolatile memory, and the like. The communication unit 509 includes an antenna, a network interface, and the like. The drive 510 drives a removable recording medium 511 such as a magnetic disk, an optical disk, a magneto-optical disk, or a semiconductor memory.

In the computer that is configured as described above, the CPU 501 loads, for example, a program stored in the recording unit 508 into the RAM 503 through the input-output interface 505 and the bus 504, then executes the program, and consequently the above-described series of processing is performed.

The program executed by the computer (CPU 501) can be provided by being recorded, for example, in a removable recording medium 511 such as a package media. In addition, the program can be provided through a wired or wireless transmission medium such as a local area network, the Internet, and digital satellite broadcasting.

In the computer, the program can be installed in the recording unit 508 through the input-output interface 505 by mounting the removable recording medium 511 to the drive 510. In addition, the program can be received by the communication unit 509 through a wired or wireless transmission medium, and can be installed in the recording unit 508. Besides the above, the program can be installed in the ROM 502 or the recording unit 508 beforehand.

It should be noted that the program executed by the computer may be a program in which processing is time-sequentially performed along the order described in the present description, or may be a program in which processing is performed in parallel or in the required timing, for example, when a call is made.

In addition, embodiments of the present technology are not limited to the embodiments described above. Various modifications can be made within the scope that does not deviate from the gist of the present technology.

For example, the present technology can be configured as cloud computing in which one function is processed by being shared by a plurality of devices in cooperation through a network.

Further, each step explained in the above-described flowchart is executed by one device. Alternatively, the each step can be executed by being shared by a plurality of devices.

Furthermore, in a case where one step includes a plurality of pieces of processing, the plurality of pieces of processing included in the one step is executed by one device. Alternatively, the plurality of pieces of processing can be executed by being shared by a plurality of devices.

Moreover, the present technology may have the following configuration.

(1)

A wireless communication device connected to one or a plurality of target wireless communication devices, the wireless communication device including:

a transmission unit that transmits, to another wireless communication device, a measurement request signal requesting measurement related to a propagation status of a signal from the target wireless communication device; and a receiving unit that receives a measurement request response signal transmitted from the another wireless communication device in response to the measurement request signal, the measurement request response signal including a result of the measurement.

(2)

The wireless communication device set forth in (1), further including a determining unit that determines a connection destination of the target wireless communication device on the basis of the result of the measurement, in which the determining unit determines a connection destination of the target wireless communication device by comparing a propagation status of a signal between the wireless communication device and the target wireless communication device with a propagation status of a signal between the another wireless communication device and the target wireless communication device, the latter propagation status being indicated by the result of the measurement.

(3)

The wireless communication device set forth in (2), in which:

the transmission unit further transmits, to the target wireless communication device, a transmission request signal that gives an instruction on transmission of a response signal for the measurement; and the receiving unit receives, from the another wireless communication device, the measurement request response signal including the result of the measurement performed by receiving the response signal transmitted from the target wireless communication device.

(4)

The wireless communication device set forth in (3), in which the measurement request signal includes information used to identify the target wireless communication device that transmits the response signal.

(5)

The wireless communication device set forth in (3) or (4), in which:

the receiving unit receives the response signal transmitted from the target wireless communication device; and the determining unit compares a propagation status of a signal between the wireless communication device and the target wireless communication device, the propagation status having been obtained by receiving the response signal, with a propagation status of a signal between the another wireless communication device and the target wireless communication device.

(6)

The wireless communication device set forth in any one of (3) to (5), in which the transmission request signal includes a trigger frame defined by IEE 802.11ax.

(7)

The wireless communication device set forth in any one of (3) to (6), in which the determining unit compares distance indicator information that serves as an indicator of a distance to the target wireless communication device as a propagation status.

(8)

The wireless communication device set forth in (7), in which the distance indicator information includes reception intensity of the response signal, reception time of the response signal, time from transmission time of the response signal to reception time of the response signal, or an error property at the time of receiving of the response signal.

(9)

The wireless communication device set forth in (8), in which the measurement request signal includes information used to identify transmission timing of the response signal.

(10)

The wireless communication device set forth in any one of (1) to (9), in which the transmission unit transmits, to the target wireless communication device, a connection request inducing signal that gives an instruction on transmission of a connection request signal requesting connection to the another wireless communication device that has been determined as a new connection destination of the target wireless communication device.

(11)

A wireless communication method performed by a wireless communication device connected to one or a plurality of target wireless communication devices, the wireless communication method including the steps of:

transmitting, to another wireless communication device, a measurement request signal requesting measurement related to a propagation status of a signal from the target wireless communication device; and receiving a measurement request response signal transmitted from the another wireless communication device in response to the measurement request signal, the measurement request response signal including a result of the measurement.

(12)

A wireless communication device including:

a receiving unit that, with respect to one or a plurality of target wireless communication devices connected to another wireless communication device, receives a measurement request signal requesting measurement related to a propagation status of a signal from the target wireless communication device, the measurement request signal having been transmitted from the another wireless communication device;

a signal generation unit that, in response to the measurement request signal, generates a measurement request response signal including a result of the measurement related to the propagation status of the signal from the target wireless communication device; and a transmission unit that transmits the measurement request response signal to the another wireless communication device.

(13)

The wireless communication device set forth in (12), in which:

the another wireless communication device transmits a transmission request signal that gives an instruction on transmission of a response signal for the measurement, and consequently the receiving unit further receives the response signal transmitted from the target wireless communication device in response to the transmission request signal; and the signal generation unit generates the measurement request response signal including a result of the measurement obtained by receiving the response signal.

(14)

The wireless communication device set forth in (13), in which:

the measurement request signal includes information used to identify the target wireless communication device that transmits the response signal; and the signal generation unit generates the measurement request response signal including identification information identifying the target wireless communication device that is a sender of the response signal, and including a result of the measurement obtained with respect to the target wireless communication device identified by the identification information.

(15)

The wireless communication device set forth in (13) or (14), in which the transmission request signal includes a trigger frame defined by IEE 802.11ax.

(16)

The wireless communication device set forth in any one of (13) to (15), in which the result of the measurement includes distance indicator information that serves as an indicator of a distance to the target wireless communication device.

(17)

The wireless communication device set forth in (16), further including a measurement unit that performs the measurement on the basis of receiving timing of the response signal or the received response signal.

(18)

The wireless communication device set forth in (16) or (17), in which the distance indicator information includes reception intensity of the response signal, reception time of the response signal, time from transmission time of the response signal to reception time of the response signal, or an error property at the time of receiving of the response signal.

(19)

The wireless communication device set forth in (18), in which the measurement request signal includes information used to identify transmission timing of the response signal.

(20)

A wireless communication method performed by a wireless communication device, the wireless communication method including the steps of:

with respect to one or a plurality of target wireless communication devices connected to another wireless communication device, receiving a measurement request signal requesting measurement related to a propagation status of a signal from the target wireless communication device, the measurement request signal having been transmitted from the another wireless communication device;

in response to the measurement request signal, generating a measurement request response signal including a result of the measurement related to the propagation status of the signal from the target wireless communication device; and transmitting the measurement request response signal to the another wireless communication device.

(21)

A wireless communication device including:

a receiving unit that receives a connection request inducing signal that has been transmitted from a first wireless communication device connected, and that gives an instruction on transmission of a connection request signal requesting connection to a second wireless communication device determined as its own new connection destination; and a transmission unit that transmits the connection request signal to the second wireless communication device according to the connection request inducing signal.

(22)

The wireless communication device set forth in (21), in which the receiving unit receives a transmission request signal that has been transmitted from the first wireless communication device, and that gives an instruction on transmission of a response signal for measurement related to a propagation status of a signal to/from the second wireless communication device, and after the response signal has been transmitted by the transmission unit in response to the transmission request signal, receives the connection request inducing signal transmitted from the first wireless communication device.

(23)

The wireless communication device set forth in (22), in which the second wireless communication device that serves as its own new connection destination is determined by the first wireless communication device on the basis of a result of the measurement.

(24)

A wireless communication method performed by a wireless communication device, the wireless communication method including the steps of:

receiving a connection request inducing signal that has been transmitted from a first wireless communication device connected, and that instructs transmission of a connection request signal requesting connection to a second wireless communication device determined as its own new connection destination; and transmitting the connection request signal to the second wireless communication device according to the connection request inducing signal.

REFERENCE SIGNS LIST

11 Wireless communication device
21-1 to 21-n, 21 Antenna
22 Wireless communication module
23 Data processing unit
52-1 to 52-n, 52 RF receiving unit
55 Signal generation unit
57-1 to 57-n, 57 RF transmission unit
58 Control unit

The invention claimed is:

1. A control device configured to:

control wireless communication of a first wireless communication device, wherein the control device comprises:

a processing circuitry configured to:

control transmission, to a second wireless communication device, of a measurement request signal that requests measurement related to a first propagation status of a first signal from at least one target wireless communication device, wherein the first wireless communication device is configured to connect to the at least one target wireless communication device;

control reception of a measurement request response signal transmitted from the second wireless communication device in response to the measurement request signal, the measurement request response signal including a result of the measurement; and control transmission, to the at least one target wireless communication device, of a connection request inducing signal that gives an instruction on transmission of a connection request signal, wherein the connection request signal requests connection to the second wireless communication device determined as a new connection destination of the at least one target wireless communication device.

2. The control device according to claim 1, wherein the processing circuitry is further configured to control determination of a connection destination of the at least one target wireless communication device based on the result of the measurement, the connection destination of the at least one target wireless communication device is determined based on a comparison of a second propagation status of a second signal between the first wireless communication device and the at least one target wireless communication device with the first propagation status of the first signal between the second wireless communication device and the at least one target wireless communication device, and the first propagation status is indicated by the result of the measurement.

3. The control device according to claim 2, wherein the processing circuitry is further configured to:

control transmission, to the at least one target wireless communication device, of a transmission request signal that gives an instruction on transmission of a response signal for the measurement; and control the reception, from the second wireless communication device, of the measurement request response signal including the result of the measurement based on a reception of the response signal transmitted from the at least one target wireless communication device.

4. The control device according to claim 3, wherein the measurement request signal includes information for identification of the at least one target wireless communication device that transmits the response signal.

5. The control device according to claim 3, wherein the processing circuitry is further configured to:

control the reception of the response signal transmitted from the at least one target wireless communication device; and control comparison of the second propagation status of the second signal between the first wireless communication device and the at least one target wireless communication device with the first propagation status of the first signal between the second wireless communication device and the at least one target wireless communication device, wherein the second propagation status is based on the response signal.

6. The control device according to claim 3, wherein the transmission request signal includes a trigger frame defined by IEE 802.11ax.

7. The control device according to claim 3, wherein the processing circuitry is further configured to control comparison of distance indicator information that serves as an indicator of a distance between the at least one target wireless communication device and the second wireless communication device as the first propagation status.

8. The control device according to claim 7, wherein the distance indicator information includes at least one of a reception intensity of the response signal, a reception time of the response signal, a time from a transmission time of the response signal to the reception time of the response signal, or an error property at the reception time of the response signal.

9. The control device according to claim 8, wherein the measurement request signal includes information for identification of the transmission time of the response signal.

10. A control device configured to:
control wireless communication of a first wireless communication device, wherein the control device comprises:
a processing circuitry unit (CPU) configured to:
control reception of a measurement request signal that requests measurement related to a first propagation status of a first signal from at least one target wireless communication device, wherein
the at least one target wireless communication device is connected to a second wireless communication device, and
the measurement request signal is transmitted from the second wireless communication device;
control generation, in response to the measurement request signal, of a measurement request response signal including a result of the measurement related to the first propagation status of the first signal from the at least one target wireless communication device;
control transmission of the measurement request response signal to the second wireless communication device; and
control reception, from the at least one target wireless communication device, of an association request frame in response to a connection request inducing signal that requests connection to the first wireless communication device determined as a new connection destination of the at least one target wireless communication device.

11. The control device according to claim 10, wherein the processing circuitry is further configured to:
control transmission of a transmission request signal that gives an instruction on transmission of a response signal for the measurement;
control reception of the response signal transmitted from the at least one target wireless communication device in response to the transmission request signal; and
control generation of the measurement request response signal including the result of the measurement based on the response signal.

12. The control device according to claim 11, wherein
the measurement request signal includes information for identification of the at least one target wireless communication device that transmits the response signal, and
the processing circuitry is further configured to control generation of the measurement request response signal, wherein the measurement request response signal includes:

the information that identifies for the identification of the at least one target wireless communication device that transmits the response signal, and
the result of the measurement with respect to the at least one target wireless communication device identified by the information for the identification of the at least one target wireless communication device.

13. The control device according to claim 11, wherein the transmission request signal includes a trigger frame defined by IEEE 802.11ax.

14. The control device according to claim 11, wherein the result of the measurement includes distance indicator information that serves as an indicator of a distance to the at least one target wireless communication device.

15. The control device according to claim 14, wherein the processing circuitry is further configured to control the measurement based on at least one of a time of the reception of the response signal or the received response signal.

16. The control device according to claim 14, wherein the distance indicator information includes at least one of a reception intensity of the response signal, a reception time of the response signal, a time from a transmission time of the response signal to the reception time of the response signal, or an error property at the reception time of the response signal.

17. The control device according to claim 16, wherein the measurement request signal includes information for identification of the transmission time of the response signal.

18. A control device configured to:
control wireless communication of a first wireless communication device, wherein the control device comprises:
a processing circuitry configured to:
control reception of a connection request inducing signal transmitted from a second wireless communication device,
wherein the connection request inducing signal gives an instruction on transmission of a connection request signal that requests connection to a third wireless communication device determined as a new connection destination for the first wireless communication device; and
control the transmission of the connection request signal to the third wireless communication device based on the connection request inducing signal.

19. The control device according to claim 18, wherein the processing circuitry is further configured to:
control reception of a transmission request signal transmitted from the second wireless communication device, wherein the transmission request signal gives an instruction on transmission of a response signal for measurement related to a propagation status of a signal to/from the third wireless communication device; and
control the reception of the connection request inducing signal, transmitted from the second wireless communication device, based on the response signal transmitted in response to the transmission request signal.

20. The control device according to claim 19, wherein the third wireless communication device that serves as the new connection destination is determined by the second wireless communication device based on a result of the measurement.

* * * * *